(12) United States Patent
Kravitz et al.

(10) Patent No.: US 12,373,210 B2
(45) Date of Patent: Jul. 29, 2025

(54) TRANSFER BUFFER BETWEEN A SCALAR PIPELINE AND VECTOR PIPELINE

(71) Applicant: SiFive, Inc., San Mateo, CA (US)

(72) Inventors: David Kravitz, Cambridge, MA (US); Andrew Hanselman, Champaign, IL (US); Bradley Gene Burgess, Sunset Valley, TX (US)

(73) Assignee: SiFive, Inc., Santa Clara, CA (US)

( * ) Notice: Subject to any disclaimer, the term of this patent is extended or adjusted under 35 U.S.C. 154(b) by 61 days.

(21) Appl. No.: 18/524,185

(22) Filed: Nov. 30, 2023

(65) Prior Publication Data

US 2024/0184575 A1 Jun. 6, 2024

Related U.S. Application Data

(60) Provisional application No. 63/429,658, filed on Dec. 2, 2022.

(51) Int. Cl.
*G06F 9/30* (2018.01)
*G06F 9/355* (2018.01)

(52) U.S. Cl.
CPC ........ *G06F 9/30036* (2013.01); *G06F 9/3555* (2013.01)

(58) Field of Classification Search
CPC ............................ G06F 9/30036; G06F 9/3555
See application file for complete search history.

(56) References Cited

U.S. PATENT DOCUMENTS

| | | | | |
|---|---|---|---|---|
| 11,900,116 | B1* | 2/2024 | Nguyen | G06F 9/3869 |
| 2012/0260061 | A1* | 10/2012 | Reid | G06F 9/30109 |
| | | | | 712/3 |
| 2014/0244967 | A1* | 8/2014 | Ingle | G06F 9/3013 |
| | | | | 712/3 |
| 2017/0277537 | A1* | 9/2017 | Grocutt | G06F 9/30087 |

* cited by examiner

*Primary Examiner* — Zachary K Huson
(74) *Attorney, Agent, or Firm* — Kilpatrick Townsend & Stockton LLP

(57) ABSTRACT

Systems and methods are disclosed for transferring an operand between a vector pipeline and a scalar pipeline. For example, some methods may include transferring an operand from a scalar pipeline to a scalar-to-vector buffer responsive to the scalar pipeline executing a first micro-op, wherein the scalar-to-vector buffer includes an entry having a width equal to a width of a scalar register of the scalar pipeline and a data store configured to store an indication mapping the entry to the first micro-op; updating the data store to include the indication mapping the entry to the first micro-op; identifying, by the vector pipeline in response to execution of a second micro-op and in dependence on the indication mapping the entry to the first micro-op, the entry storing the operand; and transferring the operand from the entry in the scalar-to-vector buffer to the vector pipeline responsive to the vector pipeline executing the second micro-op.

20 Claims, 12 Drawing Sheets

TRANSFER BUFFER BETWEEN A SCALAR PIPELINE AND VECTOR PIPELINE

CROSS-REFERENCE TO RELATED APPLICATION(S)

This application claims priority to and the benefit of U.S. Provisional Patent Application Ser. No. 63/429,658, filed Dec. 2, 2022, the entire disclosure of which is hereby incorporated by reference.

TECHNICAL FIELD

This disclosure relates generally to central processing units or processor cores and, more specifically, to a transfer buffer for transferring operands between a scalar pipeline and a vector pipeline.

BACKGROUND

A central processing unit (CPU) or processor core may be implemented according to a particular microarchitecture. As used herein, a "microarchitecture" refers to the way an instruction set architecture (ISA) (e.g., the RISC-V instruction set) is implemented by a processor core. A microarchitecture may be implemented by various components, such as dispatch units, execution units, registers, caches, queues, data paths, and/or other logic associated with instruction flow. A processor core may execute instructions in a pipeline based on the microarchitecture that is implemented.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
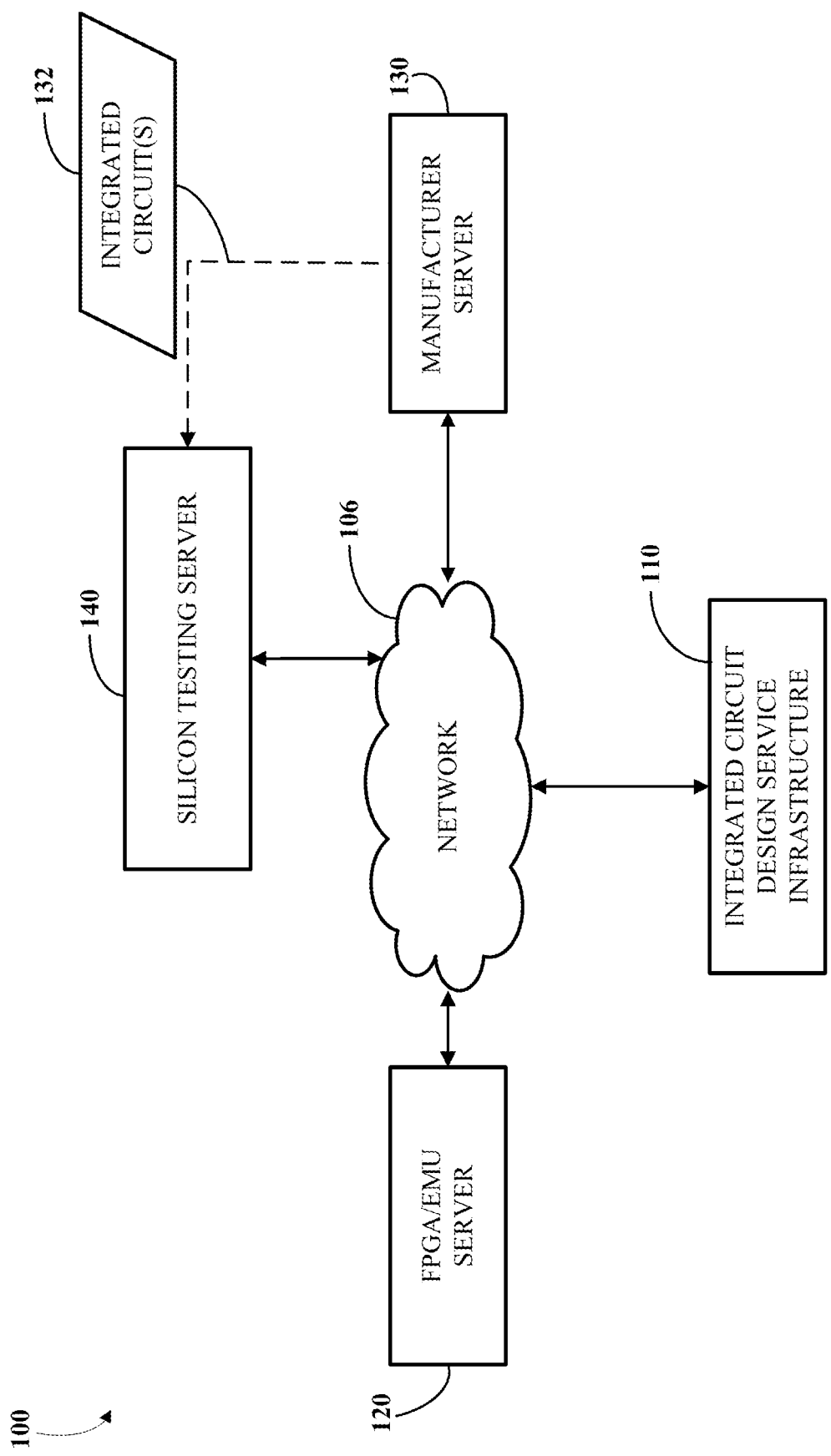
FIG. 1 is a block diagram of an example of a system for facilitating generation and manufacture of integrated circuits.

An Instruction Set Architecture (ISA) (such as the RISC-V ISA) may implement scalar and vector instructions. Scalar instructions take arguments that consist of a single element of data and vector instructions take arguments that may include multiple elements of data to be processed by a single instruction. Scalar instructions may be implemented in a scalar pipeline and vector instructions may be implemented in a vector pipeline. Each pipeline may have their own physical registers storing operands for execution in their respective pipeline. For example, the scalar pipeline may have scalar registers storing single element operands and the vector pipeline may have vector registers storing multi-element operands. In some implementations, the scalar pipeline and the vector pipeline may be portions of a larger pipeline and may share some stages (e.g., one or more shared fetch stages and a shared instruction decode stage). Some vector instructions may use scalar data and vector data as arguments. For example, the scalar data may be a single element operand that may be stored in a scalar register. As an example, a vector load instruction may use a single element operand identifying an address of the vector data to load. In another example, a vector operation may store a single element operand as an element in a multi-element operand. In another example, a scaling vector operation may use a single element operand as a scaling factor. Vector instructions may also result in a scalar data as an output. For example, a vector instruction for finding the length of a vector results in a scalar output.

Implementations of this disclosure are designed to improve the performance of processor cores that implement a vector pipeline. Vector operations that use a single element operand or scalar operations that load a single element operand from a vector operation benefit from aspects of this disclosure that enable operands to be transferred between pipelines within the core in an efficient manner. Additionally, the transfer is asynchronous and the different pipelines do not have to wait for another pipeline to be ready before transferring the operand. In some implementations, the vector pipeline, the scalar pipeline, or the vector pipeline and the scalar pipeline may be out-of-order pipelines. In some examples, the scalar pipeline and the vector pipeline may share a reorder buffer (ROB) for processing instructions out-of-order. In some examples, the integrated circuit may transfer an operand from the scalar pipeline to the vector pipeline, from the vector pipeline to the scalar pipeline, or from a first pipeline to a second pipeline.

The integrated circuit makes use of transfer buffers to transfer operands between different pipelines. The transfer buffers may include scalar-to-vector buffers for transferring a single element operand from the scalar pipeline to the vector pipeline and vector-to-scalar (V2S) buffers for transferring single element operands from the vector pipeline to the scalar pipeline. Control logic coordinates the handoff of an operand stored in an entry in the transfer buffer between the pipelines. The control logic allows the operand stored in the entry in the transfer buffer to be held until a pipeline consuming the operand is ready and allows the pipeline that produced the operand to continue to the next instruction.

Implementations described herein may provide advantages over conventional processors, such as, for example, reducing power consumption and/or improving performance of the processor core. For instance, storing a single element operand in a vector register is inefficient since the single element operand is much smaller than a multi-element operand resulting in wasted resources in the integrated circuit.

As used herein, the term "circuitry" refers to an arrangement of electronic components (e.g., transistors, resistors, capacitors, and/or inductors) that is structured to implement one or more functions. For example, a circuitry may include one or more transistors interconnected to form logic gates that collectively implement a logical function.

To describe some implementations in greater detail, reference is first made to examples of hardware and software structures used to implement a system including components that may invoke eviction operations based on eviction message types. FIG. 1 is a block diagram of an example of a system 100 for generation and manufacture of integrated circuits. The system 100 includes a network 106, an integrated circuit design service infrastructure 110 (e.g., integrated circuit generator), a field programmable gate array (FPGA)/emulator server 120, and a manufacturer server 130. For example, a user may utilize a web client or a scripting application program interface (API) client to command the integrated circuit design service infrastructure 110 to automatically generate an integrated circuit design based on a set of design parameter values selected by the user for one or more template integrated circuit designs. In some implementations, the integrated circuit design service infrastructure 110 may be configured to generate an integrated circuit design like the integrated circuit design shown and described in FIGS. 3-5.

The integrated circuit design service infrastructure 110 may include a register-transfer level (RTL) service module configured to generate an RTL data structure for the integrated circuit based on a design parameters data structure. For example, the RTL service module may be implemented as Scala code. For example, the RTL service module may be implemented using Chisel. For example, the RTL service module may be implemented using flexible intermediate representation for register-transfer level (FIRRTL) and/or a FIRRTL compiler. For example, the RTL service module may be implemented using Diplomacy. For example, the RTL service module may enable a well-designed chip to be automatically developed from a high level set of configuration settings using a mix of Diplomacy, Chisel, and FIRRTL. The RTL service module may take the design parameters data structure (e.g., a java script object notation (JSON) file) as input and output an RTL data structure (e.g., a Verilog file) for the chip.

In some implementations, the integrated circuit design service infrastructure 110 may invoke (e.g., via network communications over the network 106) testing of the resulting design that is performed by the FPGA/emulation server 120 that is running one or more FPGAs or other types of hardware or software emulators. For example, the integrated circuit design service infrastructure 110 may invoke a test using a field programmable gate array, programmed based on a field programmable gate array emulation data structure, to obtain an emulation result. The field programmable gate array may be operating on the FPGA/emulation server 120, which may be a cloud server. Test results may be returned by the FPGA/emulation server 120 to the integrated circuit design service infrastructure 110 and relayed in a useful format to the user (e.g., via a web client or a scripting API client).

The integrated circuit design service infrastructure 110 may also facilitate the manufacture of integrated circuits using the integrated circuit design in a manufacturing facility associated with the manufacturer server 130. In some implementations, a physical design specification (e.g., a graphic data system (GDS) file, such as a GDSII file) based on a physical design data structure for the integrated circuit is transmitted to the manufacturer server 130 to invoke manufacturing of the integrated circuit (e.g., using manufacturing equipment of the associated manufacturer). For example, the manufacturer server 130 may host a foundry tape-out website that is configured to receive physical design specifications (e.g., such as a GDSII file or an open artwork system interchange standard (OASIS) file) to schedule or otherwise facilitate fabrication of integrated circuits. In some implementations, the integrated circuit design service infrastructure 110 supports multi-tenancy to allow multiple integrated circuit designs (e.g., from one or more users) to share fixed costs of manufacturing (e.g., reticle/mask generation, and/or shuttles wafer tests). For example, the integrated circuit design service infrastructure 110 may use a fixed package (e.g., a quasi-standardized packaging) that is defined to reduce fixed costs and facilitate sharing of reticle/mask, wafer test, and other fixed manufacturing costs. For example, the physical design specification may include one or more physical designs from one or more respective physical design data structures in order to facilitate multi-tenancy manufacturing.

In response to the transmission of the physical design specification, the manufacturer associated with the manufacturer server 130 may fabricate and/or test integrated circuits based on the integrated circuit design. For example, the associated manufacturer (e.g., a foundry) may perform optical proximity correction (OPC) and similar post-tape-out/pre-production processing, fabricate the integrated circuit(s) 132, update the integrated circuit design service infrastructure 110 (e.g., via communications with a controller or a web application server) periodically or asynchronously on the status of the manufacturing process, perform appropriate testing (e.g., wafer testing), and send to a packaging house for packaging. A packaging house may receive the finished wafers or dice from the manufacturer and test materials and update the integrated circuit design service infrastructure 110 on the status of the packaging and delivery process periodically or asynchronously. In some implementations, status updates may be relayed to the user when the user checks in using the web interface, and/or the controller might email the user that updates are available.

In some implementations, the resulting integrated circuit(s) 132 (e.g., physical chips) are delivered (e.g., via mail) to a silicon testing service provider associated with a silicon testing server 140. In some implementations, the resulting integrated circuit(s) 132 (e.g., physical chips) are installed in a system controlled by the silicon testing server 140 (e.g., a cloud server), making them quickly accessible to be run and tested remotely using network communications to control the operation of the integrated circuit(s) 132. For example, a login to the silicon testing server 140 controlling a manufactured integrated circuit(s) 132 may be sent to the integrated circuit design service infrastructure 110 and relayed to a user (e.g., via a web client). For example, the integrated circuit design service infrastructure 110 may be used to control testing of one or more integrated circuit(s) 132.

Figure 2:
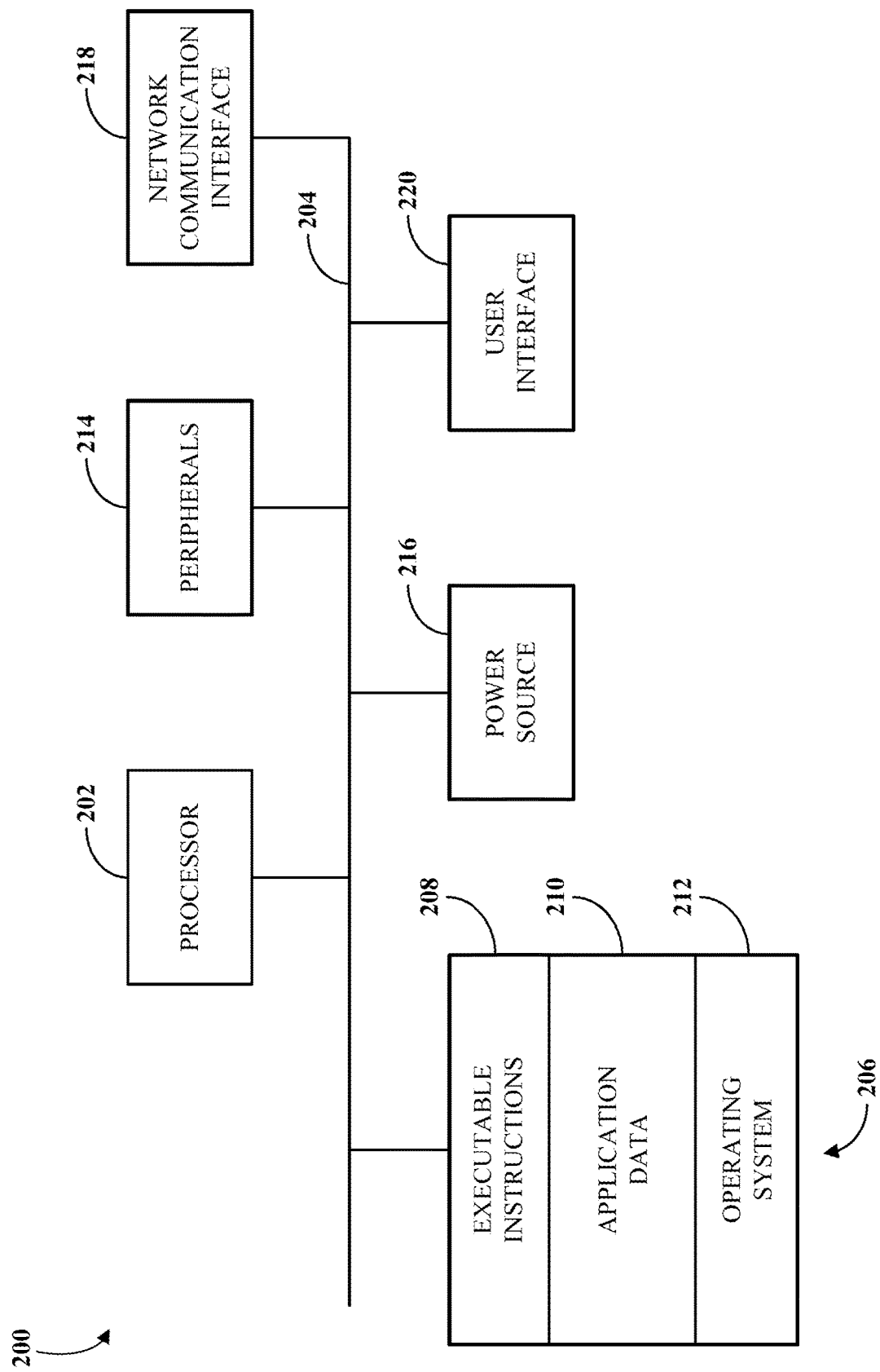
FIG. 2 is a block diagram of an example of a system for facilitating generation of a circuit representation.

FIG. 2 is a block diagram of an example of a system 200 for facilitating generation of integrated circuits, for facilitating generation of a circuit representation for an integrated circuit, and/or for programming or manufacturing an integrated circuit. The system 200 is an example of an internal configuration of a computing device. The system 200 may be used to implement the integrated circuit design service infrastructure 110, and/or to generate a file that generates a circuit representation of an integrated circuit design like the integrated circuit design shown and described in FIGS. 3-5.

The processor 202 can be a central processing unit (CPU), such as a microprocessor, and can include single or multiple processors having single or multiple processing cores. Alternatively, the processor 202 can include another type of device, or multiple devices, now existing or hereafter developed, capable of manipulating or processing information. For example, the processor 202 can include multiple processors interconnected in any manner, including hardwired or networked, including wirelessly networked. In some implementations, the operations of the processor 202 can be distributed across multiple physical devices or units that can be coupled directly or across a local area or other suitable type of network. In some implementations, the processor 202 can include a cache, or cache memory, for local storage of operating data or instructions.

The memory 206 can include volatile memory, non-volatile memory, or a combination thereof. For example, the memory 206 can include volatile memory, such as one or more dynamic random access memory (DRAM) modules such as double data rate (DDR) synchronous DRAM (SDRAM), and non-volatile memory, such as a disk drive, a solid-state drive, flash memory, Phase-Change Memory (PCM), or any form of non-volatile memory capable of persistent electronic information storage, such as in the absence of an active power supply. The memory 206 can include another type of device, or multiple devices, now existing or hereafter developed, capable of storing data or instructions for processing by the processor 202. The processor 202 can access or manipulate data in the memory 206 via the bus 204. Although shown as a single block in FIG. 2, the memory 206 can be implemented as multiple units. For example, a system 200 can include volatile memory, such as random access memory (RAM), and persistent memory, such as a hard drive or other storage.

The memory 206 can include executable instructions 208, data, such as application data 210, an operating system 212, or a combination thereof, for immediate access by the processor 202. The executable instructions 208 can include, for example, one or more application programs, which can be loaded or copied, in whole or in part, from non-volatile memory to volatile memory to be executed by the processor 202. The executable instructions 208 can be organized into programmable modules or algorithms, functional programs, codes, code segments, or combinations thereof to perform various functions described herein. For example, the executable instructions 208 can include instructions executable by the processor 202 to cause the system 200 to automatically, in response to a command, generate an integrated circuit design and associated test results based on a design parameters data structure. The application data 210 can include, for example, user files, database catalogs or dictionaries, configuration information or functional programs, such as a web browser, a web server, a database server, or a combination thereof. The operating system 212 can be, for example, Microsoft Windows®, macOS®, or Linux®; an operating system for a small device, such as a smartphone or tablet device; or an operating system for a large device, such as a mainframe computer. The memory 206 can comprise one or more devices and can utilize one or more types of storage, such as solid-state or magnetic storage.

The peripherals 214 can be coupled to the processor 202 via the bus 204. The peripherals 214 can be sensors or detectors, or devices containing any number of sensors or detectors, which can monitor the system 200 itself or the environment around the system 200. For example, a system 200 can contain a temperature sensor for measuring temperatures of components of the system 200, such as the processor 202. Other sensors or detectors can be used with the system 200, as can be contemplated. In some implementations, the power source 216 can be a battery, and the system 200 can operate independently of an external power distribution system. Any of the components of the system 200, such as the peripherals 214 or the power source 216, can communicate with the processor 202 via the bus 204.

The network communication interface 218 can also be coupled to the processor 202 via the bus 204. In some implementations, the network communication interface 218 can comprise one or more transceivers. The network communication interface 218 can, for example, provide a connection or link to a network, such as the network 106 shown in FIG. 1, via a network interface, which can be a wired network interface, such as Ethernet, or a wireless network interface. For example, the system 200 can communicate with other devices via the network communication interface 218 and the network interface using one or more network protocols, such as Ethernet, transmission control protocol (TCP), Internet protocol (IP), power line communication (PLC), Wi-Fi, infrared, general packet radio service (GPRS), global system for mobile communications (GSM), code division multiple access (CDMA), or other suitable protocols.

A user interface 220 can include a display; a positional input device, such as a mouse, touchpad, touchscreen, or the like; a keyboard; or other suitable human or machine interface devices. The user interface 220 can be coupled to the processor 202 via the bus 204. Other interface devices that permit a user to program or otherwise use the system 200 can be provided in addition to or as an alternative to a display. In some implementations, the user interface 220 can include a display, which can be a liquid crystal display (LCD), a cathode-ray tube (CRT), a light emitting diode (LED) display (e.g., an organic light emitting diode (OLED) display), or other suitable display. In some implementations, a client or server can omit the peripherals 214. The operations of the processor 202 can be distributed across multiple clients or servers, which can be coupled directly or across a local area or other suitable type of network. The memory 206 can be distributed across multiple clients or servers, such as network-based memory or memory in multiple clients or servers performing the operations of clients or servers. Although depicted here as a single bus, the bus 204 can be composed of multiple buses, which can be connected to one another through various bridges, controllers, or adapters.

A non-transitory computer readable medium may store a circuit representation that, when processed by a computer, is used to program or manufacture an integrated circuit. For example, the circuit representation may describe the integrated circuit specified using a computer readable syntax. The computer readable syntax may specify the structure or function of the integrated circuit or a combination thereof. In some implementations, the circuit representation may take the form of a hardware description language (HDL) program, a register-transfer level (RTL) data structure, a flexible intermediate representation for register-transfer level (FIRRTL) data structure, a Graphic Design System II (GDSII) data structure, a netlist, or a combination thereof. In some implementations, the integrated circuit may take the form of a field programmable gate array (FPGA), application specific integrated circuit (ASIC), system-on-a-chip (SoC), or some combination thereof. A computer may process the circuit representation in order to program or manufacture an integrated circuit, which may include programming a field programmable gate array (FPGA) or manufacturing an application specific integrated circuit (ASIC) or a system on a chip (SoC). In some implementations, the circuit representation may comprise a file that, when processed by a computer, may generate a new description of the integrated circuit. For example, the circuit representation could be written in a language such as Chisel, an HDL embedded in Scala, a statically typed general purpose programming language that supports both object-oriented programming and functional programming.

In an example, a circuit representation may be a Chisel language program which may be executed by the computer to produce a circuit representation expressed in a FIRRTL data structure. In some implementations, a design flow of processing steps may be utilized to process the circuit representation into one or more intermediate circuit representations followed by a final circuit representation which is then used to program or manufacture an integrated circuit. In one example, a circuit representation in the form of a Chisel program may be stored on a non-transitory computer readable medium and may be processed by a computer to produce a FIRRTL circuit representation. The FIRRTL circuit representation may be processed by a computer to produce an RTL circuit representation. The RTL circuit representation may be processed by the computer to produce a netlist circuit representation. The netlist circuit representation may be processed by the computer to produce a GDSII circuit representation. The GDSII circuit representation may be processed by the computer to produce the integrated circuit.

In another example, a circuit representation in the form of Verilog or VHDL may be stored on a non-transitory computer readable medium and may be processed by a computer to produce an RTL circuit representation. The RTL circuit representation may be processed by the computer to produce a netlist circuit representation. The netlist circuit representation may be processed by the computer to produce a GDSII circuit representation. The GDSII circuit representation may be processed by the computer to produce the integrated circuit. The foregoing steps may be executed by the same computer, different computers, or some combination thereof, depending on the implementation.

Figure 3A:
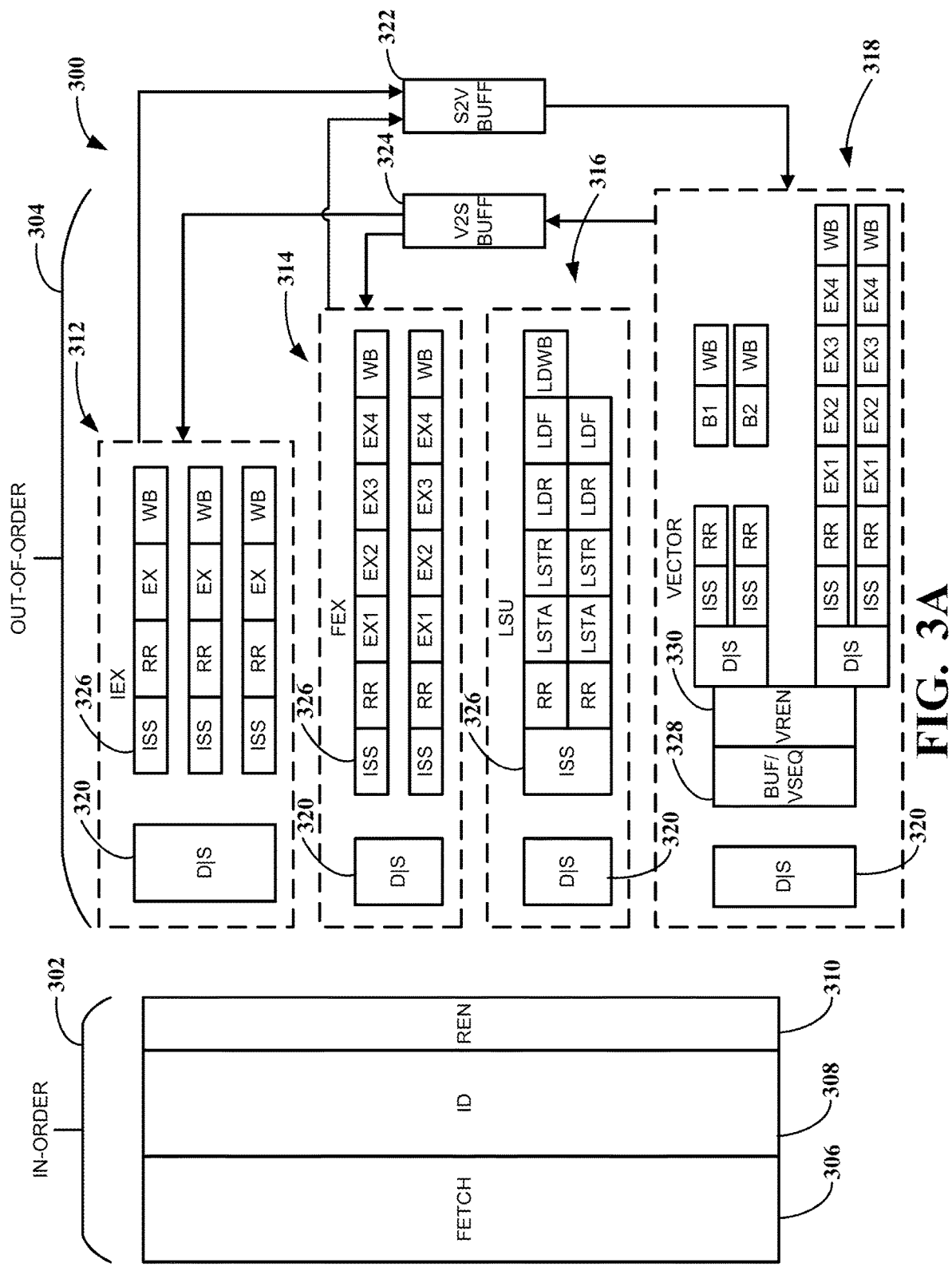
FIG. 3A is a block diagram of an example of a processor core pipeline having scalar pipelines and vector pipelines with buffers for asynchronous transfer of data between the scalar pipelines and the vector pipelines.

FIG. 3A is a block diagram of an example of a processor pipeline 300 for executing instructions including instructions that require a combination of at least one single element operand and at least one vector operand which may require transfer of an operand between scalar and vector pipelines. The processor pipeline 300 can be implemented as a processing core in an integrated circuit. The example shown in FIG. 3A is merely one possible configuration for a processor pipeline and implementations of the disclosure are not limited to the processor pipeline 300 shown. Additionally, the description of stages depicted in FIG. 3A are at a high level and are intended as an overview of the processor pipeline.

The processor pipeline 300 includes an in-order portion 302 in which instructions flow in order and an out-of-order portion 304 in which the order of the instructions may change during processing. The in-order portion 302 includes a front end stage 306 for fetching instructions, a decode stage 308 for decoding instructions, and a rename stage 310 for renaming instructions. The front end stage 306 is configured to fetch instructions from memory and can comprise multiple stages. The decode stage 308 is configured to generate micro operations (micro-ops) from the fetched instruction and steer the generated micro-ops to the appropriate pipeline. For instance, a vector instruction having only vector arguments, such as an operation to add two vectors, may generate micro-ops that are steered to the vector pipeline, a scalar instruction having only scalar arguments, such as simple addition, may generate micro-ops that are steered to a scalar pipeline, and instructions having both scalar and vector arguments, such as a vadd.vx operation which adds a scalar value to each element in a vector, may generate micro-ops that are steered to both the scalar pipeline and the vector pipeline. The rename stage maps register specifiers in the instruction to a physical register.

For each instruction that requires an operand to be transferred between pipelines, the rename stage 310 allocates an entry in a transfer buffer such as scalar-to-vector buffer 322 or vector-to-scalar buffer 324. The transfer buffer can be a logically circular buffer and a data store associated with the transfer buffer can map pointers for identifying which entry should be allocated next. For example, a "last" pointer can point to the most recent entry in the transfer buffer and a "committed" pointer can point to the next entry in the transfer buffer to be committed. Each time a micro-op requires an entry in the transfer buffer the "last" pointer is incremented, and the value of the pointer is used by the micro-ops to write and read an entry in the transfer buffer. The micro-ops can include an identifier that maps the micro-op to the entry in the transfer buffer. The transfer buffer will be described in more detail in the description of FIGS. 3 and 9.

The out-of-order portion 304 includes a scalar integer execution unit 312 which may include multiple scalar pipelines, a scalar floating point execution unit 314 which may include multiple scalar pipelines, a load store unit 316 having at least one pipeline, and a vector execution unit 318 which may include multiple pipelines. One or more of the units 312, 314, 316, 318 and their corresponding pipelines may be asynchronous with respect to one another such that micro-ops entering the pipelines can be completed at different times. Additionally, one or more of the pipelines may be an out-of-order pipeline that is configured to execute micro-ops in an order other than the order in which the micro-ops are received.

One or more of the units 312, 314, 316, 318 includes a dispatch stage 320 that includes a reorder buffer (ROB) configured to track the state of inflight micro-ops for the respective unit. The ROB enables the unit to execute the micro-ops in an order other than the order in which the micro-ops are received. Additionally, each entry in the ROB that is associated with an instruction that needs to transfer operands between the pipelines stores a value of the number of operands that need to be transferred. When the entry in the ROB is retired, the "committed" pointer for the transfer buffer is incremented by the number of operands that were transferred as part of the instruction associated with the ROB entry.

The scalar pipelines of the scalar execution units 312, 314 include an issue stage 326 that holds dispatched micro-ops that are not yet executed. For example, if the operands for a first micro-op are not ready, the issue stage 326 may hold the first micro-op until the operands are available. The issue stage 326 may issue a second micro-op while the first micro-op is being held. The scalar pipeline then executes the issued micro-op using various stages depending on the particular pipeline, but which may include read register stages, execution stages, and write back stages as shown in FIG. 3A.

The vector execution pipeline may include a vector buffer stage 328, a vector rename stage 330, or both. Vector operations may be more complex and take longer to complete compared to scalar operations. This may increase the likelihood that a vector pipeline stage may stall or that there may not be a free vector physical register file for a vector operation at any given time. The vector buffer stage 328 holds dispatched vector micro-ops in the event that there is a stall or that there is not an available physical register file for processing the vector micro-op. The vector rename stage 330 maps the vector elements to vector registers. The vector micro-ops then enter another dispatch stage that steers the micro-ops to the proper execution issue queue. The issue queue then issues the vector micro-op when the operands are available.

Instructions that generate micro-ops for both a scalar pipeline and a vector pipeline make use of a transfer buffer (e.g., the scalar-to-vector buffer 322 and the vector-to-scalar buffer 324) to transfer operands between the pipelines. This transfer will be described in more detail in relation to the following figures, but generally a first micro-op causes a first pipeline to transfer an operand into an entry associated with the micro-op of a transfer buffer and a second micro-op causes a second pipeline to transfer the operand from the entry, which is associated with the second micro-op in addition to the first micro-op, in the transfer buffer to a register, or an operand buffer in an execution unit, of the second pipeline. Because the transfer buffer stores/holds the operands, the pipelines can operate asynchronously and the pipeline providing the operand can continue executing another micro-op without waiting for the pipeline consuming the operand to finish. For example, the transfer buffer can hold the operand for multiple clock cycles until the receiving pipeline is ready. In some instances, the transfer buffer holds the operand for a number of clock cycles greater than a length of the scalar pipeline. A value stored in the transfer buffer can be read multiple times by the second pipeline. For example, a vector instruction may be cracked into multiple micro-ops in a vector pipeline and these multiple vector micro-ops may each read data stored in the transfer buffer by scalar micro-op associated with the instruction. This value may be released or deleted in the transfer buffer after the last vector micro-op of the instruction has been retired. Additionally, since multiple operands may be held in the transfer buffer, the pipelines do not have to execute their respective micro-ops in the same order.

Figure 3B:
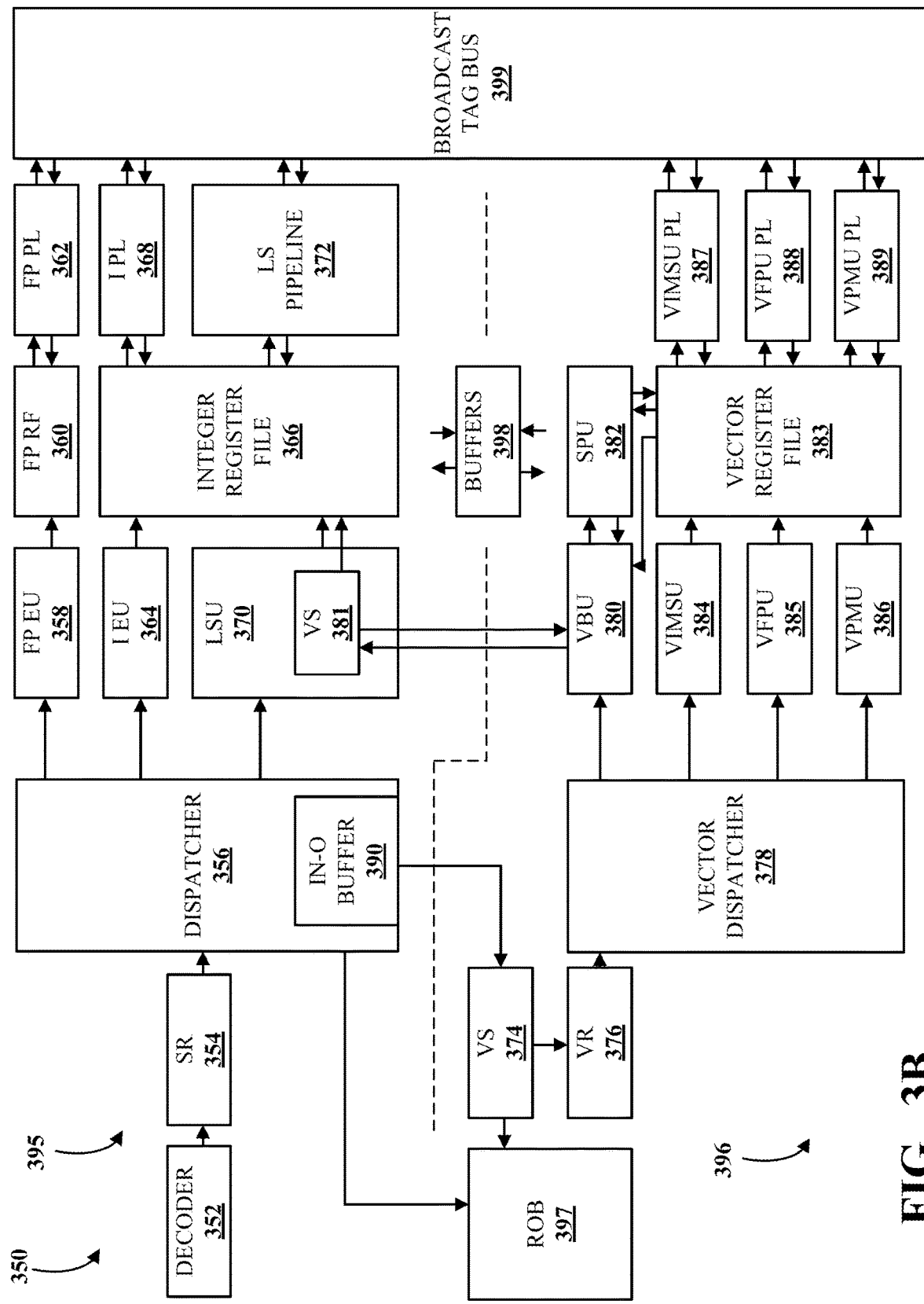
FIG. 3B is a block diagram of an example of a processor core pipeline having scalar pipelines and vector pipelines with buffers for asynchronous transfer of data between the scalar pipelines and the vector pipelines.

FIG. 3B is a block diagram of an example of a processor pipeline 350 for executing instructions including instructions that require a combination of at least one single element operand and at least one vector operand which may require transfer of an operand between scalar and vector pipelines. The processor pipeline 350 can be implemented as a processing core in an integrated circuit. The processor pipeline 350 is an example of dual pipelines with associated circuitry for executing scalar and vector instructions. The processor pipeline 350 may implement a microarchitecture. The processor pipeline 350 may be configured to fetch, decode, rename, dispatch, and execute instructions of an instruction set instruction set architecture (ISA) (e.g., the RISC-V instruction set) in pipelined data paths. The instructions may execute speculatively and out-of-order in the processor pipeline 350. The example shown in FIG. 3B is merely one possible configuration for a processor pipeline and implementations of the disclosure are not limited to the processor pipeline 350 shown. Additionally, the description of stages depicted in FIG. 3B are at a high level and are intended as an overview of the processor pipeline.

The processor pipeline 350 may implement components of the microarchitecture (e.g., dispatch units, execution units, vector units, registers, caches, queues, data paths, and/or other logic associated with instruction flow as discussed herein). For example, the dual pipelines of the processor pipeline 350 may include a primary pipeline 395 connected to or in communication (collectively "connected") a vector pipeline 396, where each of the primary pipeline 395 and the vector pipeline 396 are connected to a ROB 397, transfer buffers 398, and a tag broadcast bus 399. The tag broadcast bus 399 indicates to waiting instructions (typically in an issue queue) that some processor unit is about to produce a micro-op result needed as an input operand for another micro-op. The broadcast typically indicates which result is becoming available—usually by its physical register number—and from which result bus it can be used to bypass a physical register file write-read sequence. The transfer buffers 398 can be, for example, the scalar-to-vector buffer 322, the vector-to-scalar buffer 324, or both.

The primary pipeline 395 may include a decoder 352 connected to a scalar renamer 354, which in turn is connected to a dispatcher 356. The dispatcher 356 may be connected to the ROB 397. The dispatcher 356 may be connected to a floating point path which includes a floating point execution unit 358, a floating point register file 360, and a floating point pipeline 362. The dispatcher 356 may be connected to an integer path which includes an integer execution unit 364, an integer register file 366, and an integer pipeline 368. The dispatcher 356 may be connected to a load store path which includes a load store unit 370, the integer register file 366, and a load store pipeline 372. Outputs of the floating point pipeline 362 and the integer pipeline 368 are connected to the tag broadcast bus 399, and the outputs of the floating point pipeline 362 and the integer pipeline 368 and the load store pipeline 372 are connected to the floating point register file 360 and the integer register file 366, respectively. The primary pipeline 395 and components therein may be configured to execute scalar instructions.

The vector pipeline 396 may include a vector sequencer 374 connected to the ROB 397 and a vector renamer 376, which in turn is connected to a vector dispatcher 378. The vector dispatcher 378 may be connected to a vector baler unit 380, which in turn is connected to a vector sequencer 381 in the load store unit 370 and to segment permute unit 382, which is further connected to a vector register file 383. The vector dispatcher 378 may be connected to a vector integer/move/slide unit 384, which in turn is connected to the vector register file 383. The vector dispatcher 378 may be connected to a vector floating point unit 385, which in turn is connected to the vector register file 383. The vector dispatcher 378 may be connected to a vector permute/mask unit 386, which in turn is connected to the vector register file 383. The vector register file 383 is connected to a vector integer/move/slide pipeline 387, a vector floating point pipeline 388, and a vector permute/mask pipeline 389. The outputs of the vector integer/move/slide pipeline 387, the vector floating point pipeline 388, and the vector permute/mask pipeline 389 are connected to the tag broadcast bus 399. The vector pipeline 396 and components therein may be configured to execute vector instructions.

Operationally, upon determination of a scalar instruction, the decoder 352 may decode the scalar instruction into one or more micro-operations, the scalar renamer 354 may rename the scalar operands, the dispatcher 356 may dispatch the one or more micro-operations via one or more of the floating point path, the integer path, and/or the load store path. The primary pipeline 395, at a point or component prior to out-of-order processing in the primary pipeline 395, may generate an entry(ies) in the ROB 397 for the one or more micro-operations.

Operationally, upon determination of a vector instruction, the decoder 352 may forego decoding the vector instruction, the scalar renamer 354 may forego renaming the vector operands, and the dispatcher 356 may dispatch, via an in-order buffer 390, the vector instruction to the vector sequencer 374. The primary pipeline 395, at a point or component prior to out-of-order processing in the primary pipeline 395, may generate an entry in the ROB 397 for the vector instruction. The vector sequencer 374 may decode the vector instruction into one or more micro-operations, the vector sequencer 374 may update the ROB entry with the number of micro-operations associated with the vector instruction, the vector renamer 376 may rename the vector operands, the vector dispatcher 378 may dispatch the one or more micro-operations to one or more the vector baler unit 380, the vector integer/move/slide unit 384, the vector floating point unit 385, and/or the vector permute/mask unit 386 for processing through the segment permute unit 382, the vector register file 383, the vector integer/move/slide pipeline 387, the vector floating point pipeline 388, and/or the vector permute/mask pipeline 389 for execution, as appropriate and applicable. In this instance, the vector sequencer 374 may wait for vector configuration information from the primary pipeline 395. The primary pipeline 395 may decode and resolve a vector configuration instruction, such as a VSET instruction of the RISC-V ISA, and send the vector configuration information to the vector pipeline 396 so that the vector sequencer 374 can perform decoding of the vector instruction.

Operationally, upon determination of a vector instruction with one of scalar sources or scalar destinations, the scalar renamer 354 may rename the scalar operands, and the dispatcher 356 may dispatch, via the in-order buffer 390, the vector instruction to the vector sequencer 374. The primary pipeline 395, at a point or component prior to out-of-order processing in the primary pipeline 395, may generate an entry in the ROB 397 for the vector instruction. The vector sequencer 374 may decode the vector instruction into one or more micro-operations, the vector sequencer 374 may update the ROB entry with the number of micro-operations associated with the vector instruction, the vector renamer 376 may rename the vector operands, the vector dispatcher 378 may dispatch the one or more micro-operations for execution as described herein for the vector instruction. The primary pipeline 395 may provide scalar operand information to the vector pipeline 396, and vice versa, via the transfer buffers 398 as further described herein.

Figure 4:
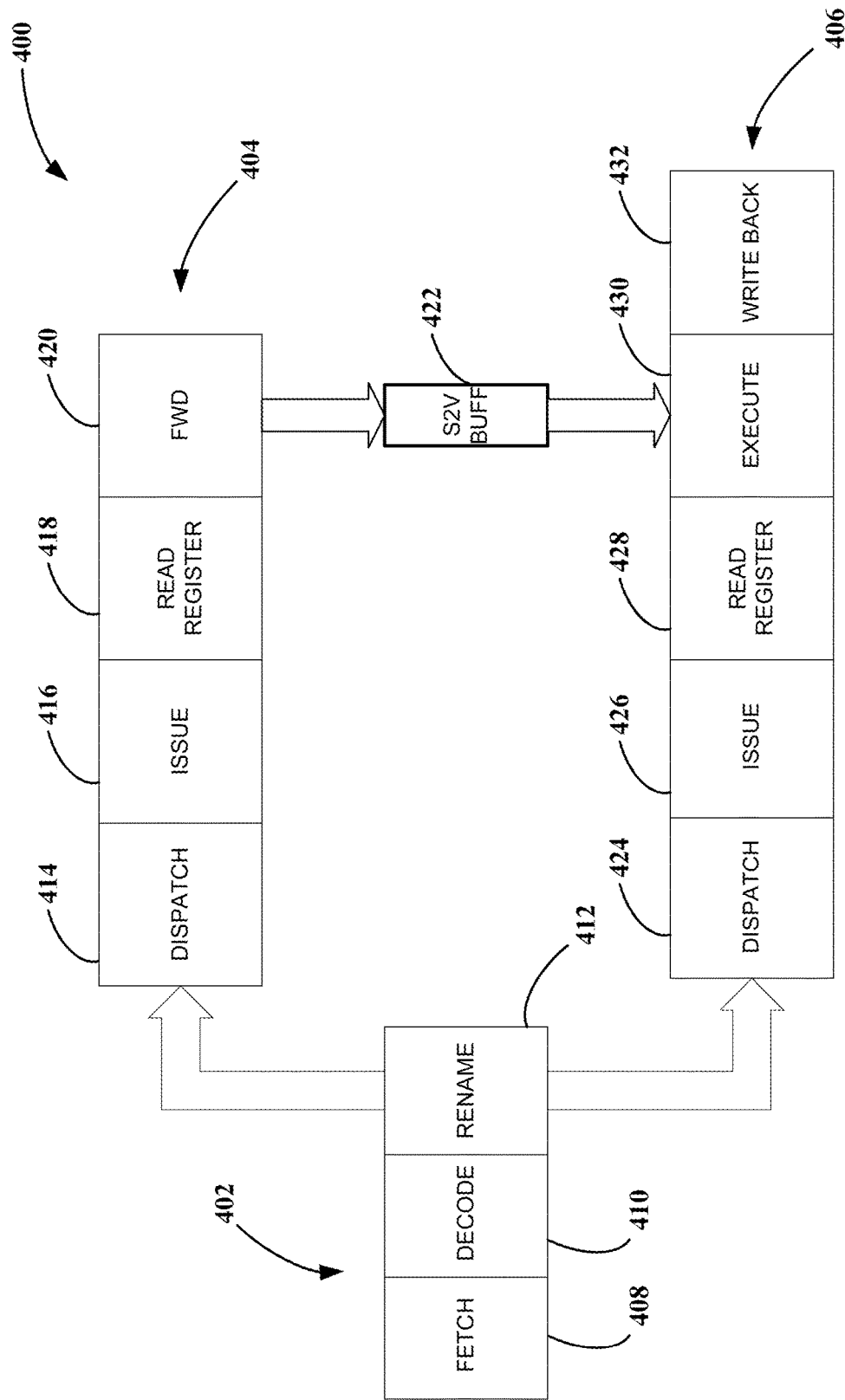
FIG. 4 is a block diagram of an example of simplified processor core pipeline having a scalar pipeline and a vector pipeline.

FIG. 4 is a block diagram showing a simplified processor pipeline 400 having a common front end 402, a separate scalar pipeline 404, a vector pipeline 406, and a scalar-to-vector buffer to transfer operands, as appropriate, between the scalar pipeline 404 and the vector pipeline 406. A fetch stage 408 fetches an instruction that includes both a scalar argument and a vector argument, a decode stage 410 decodes the instruction into micro-ops for the scalar pipeline 404 and the vector pipeline 406, and a rename stage 412 renames register specifiers in the instruction into a physical register. A first micro-op is sent to the scalar pipeline 404 and is dispatched in a dispatch stage 414. An issue stage 416 holds the micro-op until the micro-op is ready to issue and then issues the micro-op. A read register stage 418 reads an operand from the register and execution of the micro-op in forwarding stage 420 causes the scalar pipeline to transfer the operand to an entry in a scalar-to-vector buffer 422. In some implementations, transferring the operand to the entry in the scalar-to-vector buffer 422 may wake a related micro-op in the vector pipeline 406.

When the first micro-op is sent to the scalar pipeline 404, a related, second micro-op is sent to the vector pipeline 406. In some instances, the same micro-op may be sent to the scalar pipeline 404 and the vector pipeline 406. Additionally, an identifier may be included with the first and second micro-op to associate them with one another. A dispatch stage 424 in the vector pipeline 406 dispatches the second micro-op and an issue stage 426 holds the second micro-op until the second micro-op is ready to be executed. The second micro-op causes the vector pipeline 406 to read a register containing operands in a read register stage 428 and causes the vector pipeline 406 to transfer the operand from the scalar-to-vector buffer 422 to the vector pipeline 406. The second micro-op then completes its operation in a write back stage 432 by writing the received operand to a register.

The scalar-to-vector buffer 422 includes entries that have the same width as the scalar register. Thus, each operand stored in a scalar register fills one entry in the scalar-to-vector buffer when the operand is transferred to the scalar-to-vector buffer 422. The scalar-to-vector buffer 422 further includes a data store that stores mapping information for associating the entry with the micro-op that transferred the operand to the scalar-to-vector buffer. The mapping information may reference or include the identifier of the micro-op associated with the entry. Thus, when the vector pipeline needs to transfer the entry, the vector pipeline can look up the instruction in the data store to find the appropriate entry to read.

Figure 5:
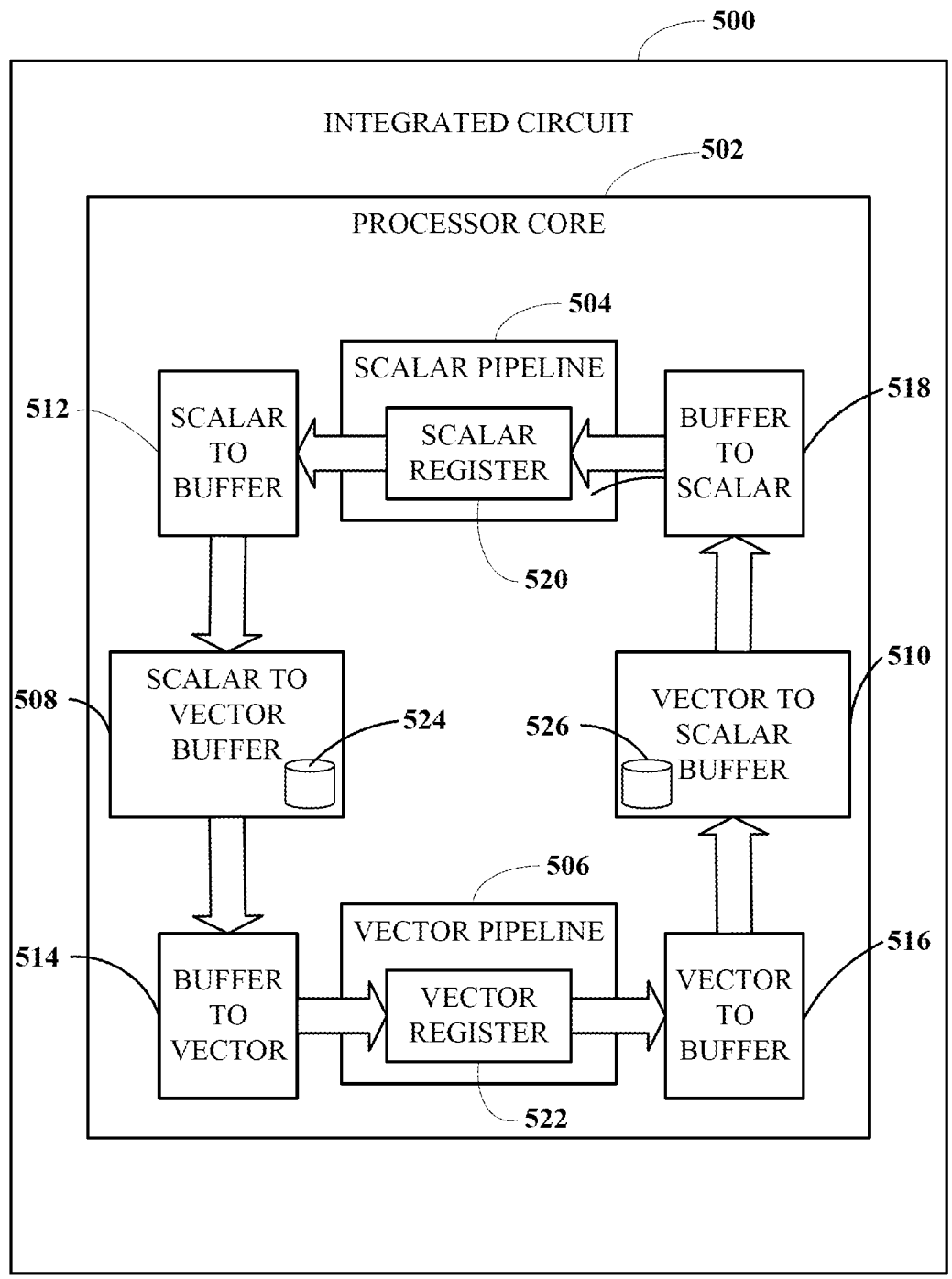
FIG. 5 is a block diagram of an example of an integrated circuit for executing instructions having single element operands and multi-element operands with buffers for asynchronous transfer of data between scalar pipelines and vector pipelines.

FIG. 5 is a block diagram of an example of an integrated circuit 500 for executing instructions including instructions that require a combination of at least one scalar argument and at least one vector argument. For example, the integrated circuit 500 may be a processor, a microprocessor, a microcontroller, or an IP core. The integrated circuit 500 includes a processor core 502 configured to execute instructions that operate on vector and scalar arguments. In this example, the processor core 502 includes a scalar pipeline 504, a vector pipeline 506, a scalar-to-vector buffer 508, a vector-to-scalar buffer 510, scalar-to-buffer execution circuitry 512, buffer-to-vector execution circuitry 514, vector-to-buffer execution circuitry 516, and buffer-to-scalar execution circuitry 518. In some implementations, the scalar pipeline 504 may be one of the scalar pipelines of FIG. 3A, FIG. 3B, or FIG. 4. Similarly, in some implementations, the vector pipeline 506 may be one of the vector pipelines of FIG. 3A, FIG. 3B, or FIG. 4.

The scalar pipeline 504 is configured to execute scalar micro-ops and includes a scalar register 520 configured to store single element operands for use by the scalar pipeline 504. The vector pipeline 506 is configured to execute vector micro-ops and includes a vector register 522 configured to store multi-element operands for use by the vector pipeline 506. The scalar-to-vector buffer 508 is configured to store operands being transferred from the scalar pipeline 504 to the vector pipeline 506. The scalar-to-vector buffer 508 has entries that may have a width equal to a width of the scalar register 520. The scalar-to-vector buffer 508 includes a data store 524 configured to store information for mapping an instruction to an entry in the scalar-to-vector buffer 508. The vector-to-scalar buffer 510 is configured to store operands being transferred from the vector pipeline 506 to the scalar pipeline 504. The vector-to-scalar buffer 510 has entries that may have a width equal to a width of the scalar register 520. The vector-to-scalar buffer 510 includes a data store 526 configured to store information mapping an instruction to an entry in the vector-to-scalar buffer 510.

The scalar-to-buffer execution circuitry 512 is configured to transfer an operand from the scalar pipeline 504 to an entry in the scalar-to-vector buffer 508 and update the data store 524 to map the entry to an instruction. The buffer-to-vector execution circuitry 514 is configured to identify the entry storing the operand based on the information mapping the instruction to the entry and transfer the operand from the entry in the scalar-to-vector buffer 508 to the vector register 522. The vector-to-buffer execution circuitry 516 is configured to transfer an operand from the vector pipeline 506 to an entry in the vector-to-scalar buffer 510 and update the data store 526 to map the entry to an instruction. The buffer-to-scalar execution circuitry 518 is configured to identify the entry storing the operand based on the information mapping the instruction to an entry and transfer the operand from the entry in the vector-to-scalar buffer 510 to the scalar register 520.

In some implementations, the data store 524 and the data store 526 may be located external to the scalar-to-vector buffer 508 and the vector-to-scalar buffer 510, respectively. For example, the data store may be a part of one of the pipelines or may be a separate data store. In some implementations, the data store 524 and the data store 526 may be combined into a single data store storing information mapping instructions to entries in the scalar-to-vector buffer 508 and the vector-to-scalar buffer 510. In some implementations, the data store 524 and the data store 526 may store an identifier, such as a ROB identification tag associated with a micro-op, and map the identifier to a reference to the entry storing the operand associated with the micro-op. In such implementations, the correct entry in the scalar-to-vector buffer or the vector-to-scalar buffer may be found by looking up the ROB identification tag of a micro-op in the data store and finding the entry mapped to the ROG identification tag.

Transferring operands between pipeline stages using the disclosed transfer buffers can improve the performance of the processor core 502 by enabling the pipelines to operate asynchronously with respect to one another. Additionally, the operands can be transferred between the pipelines in the core without requiring the operand to be written to a cache or other memory outside of the processor core. In some implementations, the integrated circuit 500 can be used to implement the technique 600 of FIG. 6. In some implementations, the integrated circuit 500 can be used to implement the technique 700 of FIG. 7. In some implementations, the integrated circuit 500 can be used to implement the technique 800 of FIG. 8. In some implementations, the integrated circuit 500 can be used to implement the technique 1000 of FIG. 10.

Figure 6:
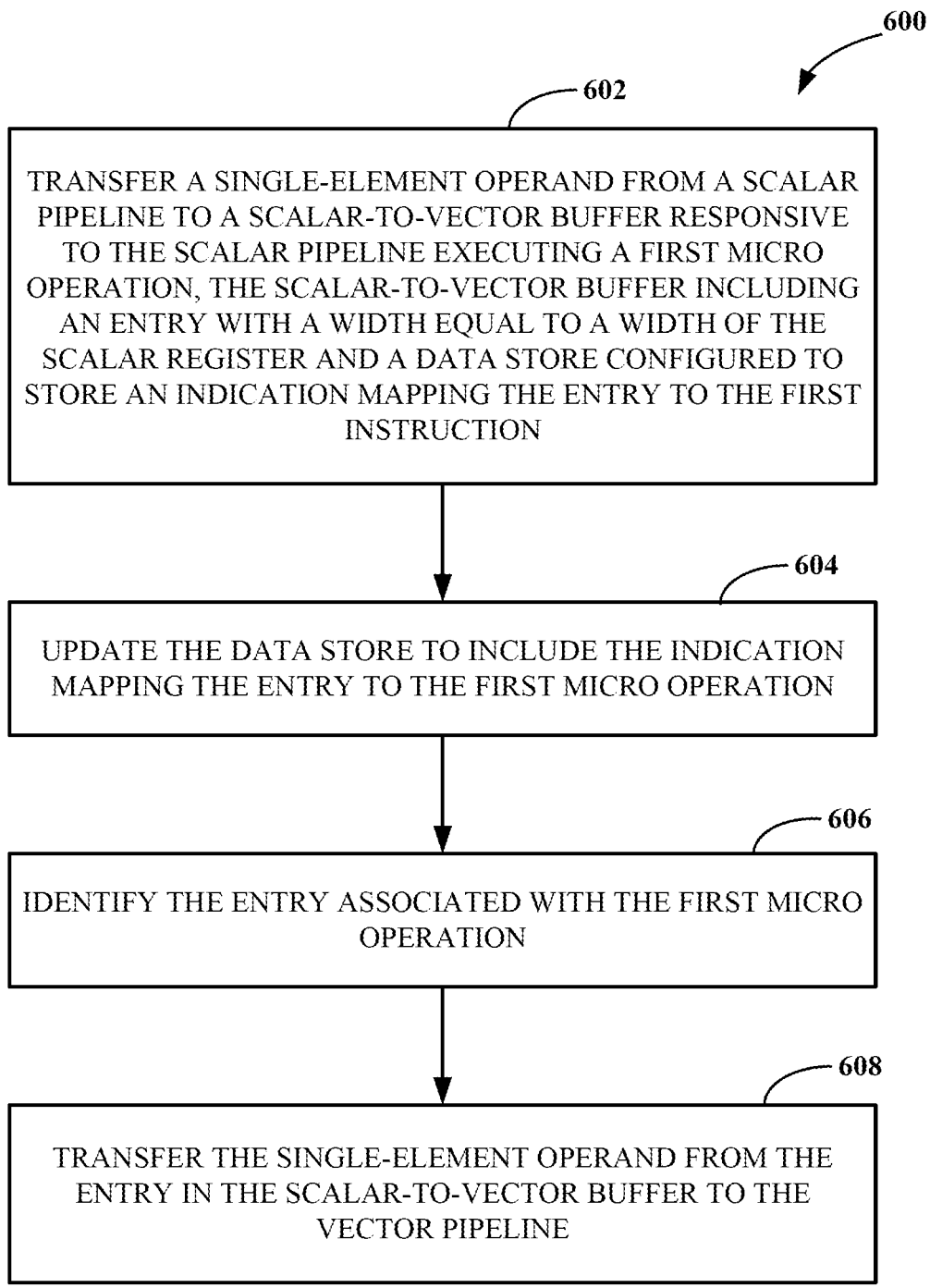
FIG. 6 is a flow chart of an example of a technique for transferring operands from a scalar pipeline to a vector pipeline.

To further describe some implementations in greater detail, reference is next made to examples of techniques for transferring operands between pipelines in a processor core. FIG. 6 is a flowchart of an example of a technique 600 for transferring operands from a scalar pipeline to a vector pipeline in a processor core. In particular, the technique 600 may be performed for a vector instruction having a scalar argument and a vector argument. The technique 600 can be executed using an integrated circuit, such as the integrated circuit of FIG. 5, having a processing core with a scalar pipeline and a vector pipeline, such as the pipelines shown in FIG. 3A, FIG. 3B, and FIG. 4. The technique 600 can be performed, for example, by executing a vector computer-executable instruction in a processing core. The steps, or operations, of the technique 600 or another technique, method, process, or algorithm described in connection with the implementations disclosed herein can be implemented directly in hardware, firmware, software executed by hardware, circuitry, a software simulation, or a combination thereof.

The technique 600 includes transferring 602 an operand from a scalar pipeline to a scalar-to-vector buffer responsive to the scalar pipeline executing a first micro-op, wherein the scalar-to-vector buffer includes an entry having a width equal to a width of a scalar register of the scalar pipeline and a data store configured to store an indication mapping the entry to the first micro-op; updating 604 the data store to include the indication mapping the entry to the first micro-op; identifying 606, by the vector pipeline in response to execution of a second micro-op and in dependence on the indication mapping the entry to the first micro-op; and transferring 608 the operand from the entry in the scalar-to-vector buffer to the vector pipeline responsive to the vector pipeline executing the second micro-op. In some implementations, the technique 600 may be implemented using the processor core 502 of FIG. 5.

Transferring 602 an operand from a scalar pipeline to a scalar-to-vector buffer may be performed by reading a register identified in the first micro-op to load the operand and saving the operand to the scalar-to-vector buffer at a location specified by a pointer associated with a scalar-to-vector buffer. For example, referring to the simplified processor pipeline 400 of FIG. 4, the fetch stage 408 can fetch a vector operation, crack the vector operation into a first micro-op for the scalar pipeline and a second micro-op for the vector pipeline at the decode stage 410. The rename stage can increment a pointer for the scalar-to-vector buffer 422 to allocate an entry for the operand being transferred. The read register stage at 218 reads the operand from a register identified in the first micro-op and at the execute/forwarding stage 420, the first micro-op causes the operand to be stored at an entry in the scalar-to-vector buffer 422 identified by the pointer set in the rename stage 412.

In some implementations, the entry for the scalar-to-vector buffer 422 may be allocated at a stage other than the rename stage 412. For example, the entry in the scalar-to-vector buffer 422 may be allocated when the micro-op is ready to issue, such as at the issue stage 416.

Updating 604 the data store to include the indication mapping the entry to the first micro-op may be performed by tagging the entry with an identifier identifying the first micro-op. For example, the data store may store the identifier with a reference to the location of the entry the operand was stored in. Referring to FIG. 4, the scalar pipeline 404 may write an identifier of the micro-op to the data store along with a reference to the location of the entry the operand was transferred to. Because the first micro-op and the second micro-op both originate from the same instruction, they may share a common identifier.

Identifying 606 the entry storing the operand may be performed by accessing the data store and parsing the identifiers associated with micro-ops that stored operands in the scalar-to-vector buffer. The second micro-op may include the same identifier as the first micro-op since they were both generated as part of the same vector instruction. When an identifier matching the identifier of the second micro-op is found, a related location of the entry in a scalar-to-vector buffer can be determined from the mapping information. Referring to FIG. 4, the vector pipeline 406 may execute the second micro-op in the execute stage 430 and in response, access the data store of the scalar-to-vector buffer 422 to determine the entry storing the operand.

Transferring 608 the operand from the entry in the scalar-to-vector buffer to the vector pipeline can be performed by accessing the entry identified in the mapping information and saving the operand in a vector pipeline. For example, referring to FIG. 4, the vector pipeline 406 can execute the second micro-op in an execute stage 430 and retrieve the operand from the entry identified in the data store. The second micro-op can then cause the vector pipeline 406 to write the operand to a vector register in the write back stage 432.

Figure 7:
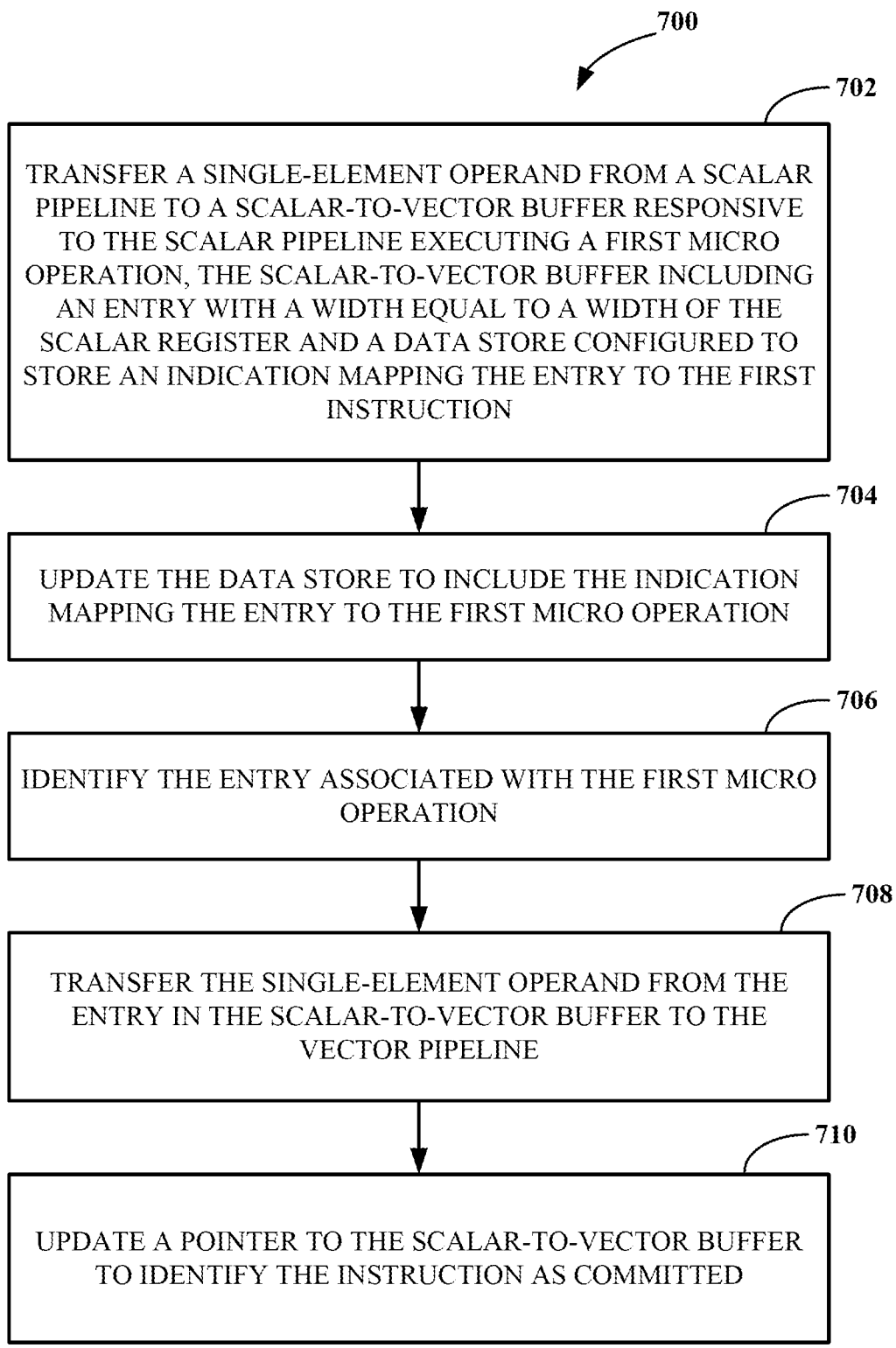
FIG. 7 is a flow chart of an example of a technique for transferring operands from a scalar pipeline to a vector pipeline.

FIG. 7 is a flow chart of an example of a technique 700 for transferring operands between pipelines in a processor core. Like the technique 600 of FIG. 6, the technique of FIG. 7 includes transferring 702 an operand from a scalar pipeline to a scalar-to-vector buffer responsive to the scalar pipeline executing a first micro-op, wherein the scalar-to-vector buffer includes an entry having a width equal to a width of a scalar register of the scalar pipeline and a data store configured to store an indication mapping the entry to the first micro-op; updating 704 the data store to include the indication mapping the entry to the first micro-op; identifying 706, by the vector pipeline in response to execution of a second micro-op and in dependence on the indication mapping the entry to the first micro-op; and transferring 708 the operand from the entry in the scalar-to-vector buffer to the vector pipeline responsive to the vector pipeline executing the second micro-op. However, the technique 700 of FIG. 7 differs from the technique 600 of FIG. 6 in that the technique 700 of FIG. 7 also includes updating 710 a pointer to a scalar-to-vector buffer to identify the instruction as committed. Like the technique 600 of FIG. 6, the technique 700 of FIG. 7 may be the technique 600 may be implemented using the processor core 502 of FIG. 5.

For example, the processor core 502 may include circuitry for updating a committed pointer to move to more recently allocated entries in the scalar-to-vector buffer 508. In some implementations, the circuitry may move the pointer a number of entries indicated in a ROB entry for the instruction. For instance, if an instruction required transferring three operands to another pipeline, the ROB entry associated with the instruction can store the value of three. When the instruction is committed, the circuitry can then move a "committed" pointer up three entries in the scalar-to-vector buffer 508 to indicate that all entries below the committed pointer are available for allocation.

Figure 8:
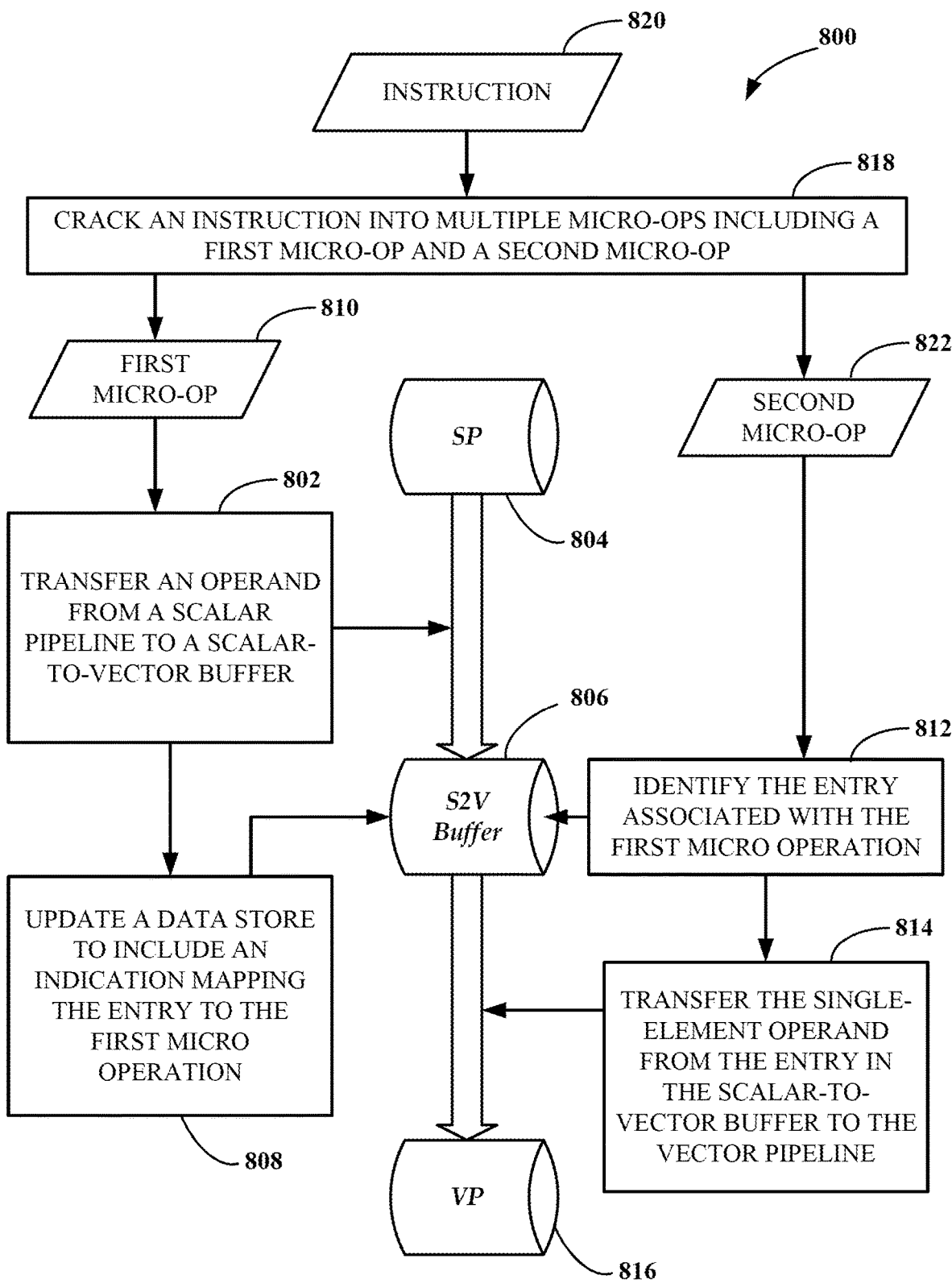
FIG. 8 is a flow chart of an example of a technique for implementing an instruction that requires an operand to be transferred from a scalar pipeline to a vector pipeline.

FIG. 8 is a flow chart of an example of a technique 800 for transferring operands between pipelines in a processor core. Similar to the technique 600 of FIG. 6, the technique of FIG. 8 includes transferring 802 transferring an operand from a scalar pipeline 804 to a scalar-to-vector buffer 806; updating 808 a data store to include an indication mapping the entry to a first micro-op 810; identifying 812 the entry associated with the first micro-op; and transferring 814 the operand from the entry in the scalar-to-vector buffer 806 to a vector pipeline 816. However, the technique 800 of FIG. 8 differs from the technique 600 of FIG. 6 in that the technique 800 of FIG. 8 also includes cracking 818 an instruction 820 into multiple micro-ops including the first micro-op 810 and a second micro-op 822. Like the technique 600 of FIG. 6, the technique 800 of FIG. 8 may be implemented using the processor core 502 of FIG. 5.

Referring to FIG. 8, cracking 818 the instruction 820 into multiple micro-ops including the first micro-op 810 and the second micro-op 822 may be performed at an instruction decode stage in a processor pipeline, such as the decode stage 308 of the processor pipeline 300 of FIG. 3A. Cracking the instruction 820 can result in generating micro-ops for each pipeline associated with the instruction 820 including the first micro-op 810 for the scalar pipeline 804 and the second micro-op 822 for the vector pipeline 816. The decode stage of the processor pipeline can associate an identifier with each of the micro-ops for identifying the micro-ops. The same identifier can be used for each of the micro-ops generated from the cracked instruction 820 to maintain a relationship between the micro-ops. In some implementations, the micro-ops can be the same micro-op, but executed by the different pipelines. For instance, the same micro-op may perform differently in a scalar pipeline compared to its performance in the vector pipeline.

Figure 9:
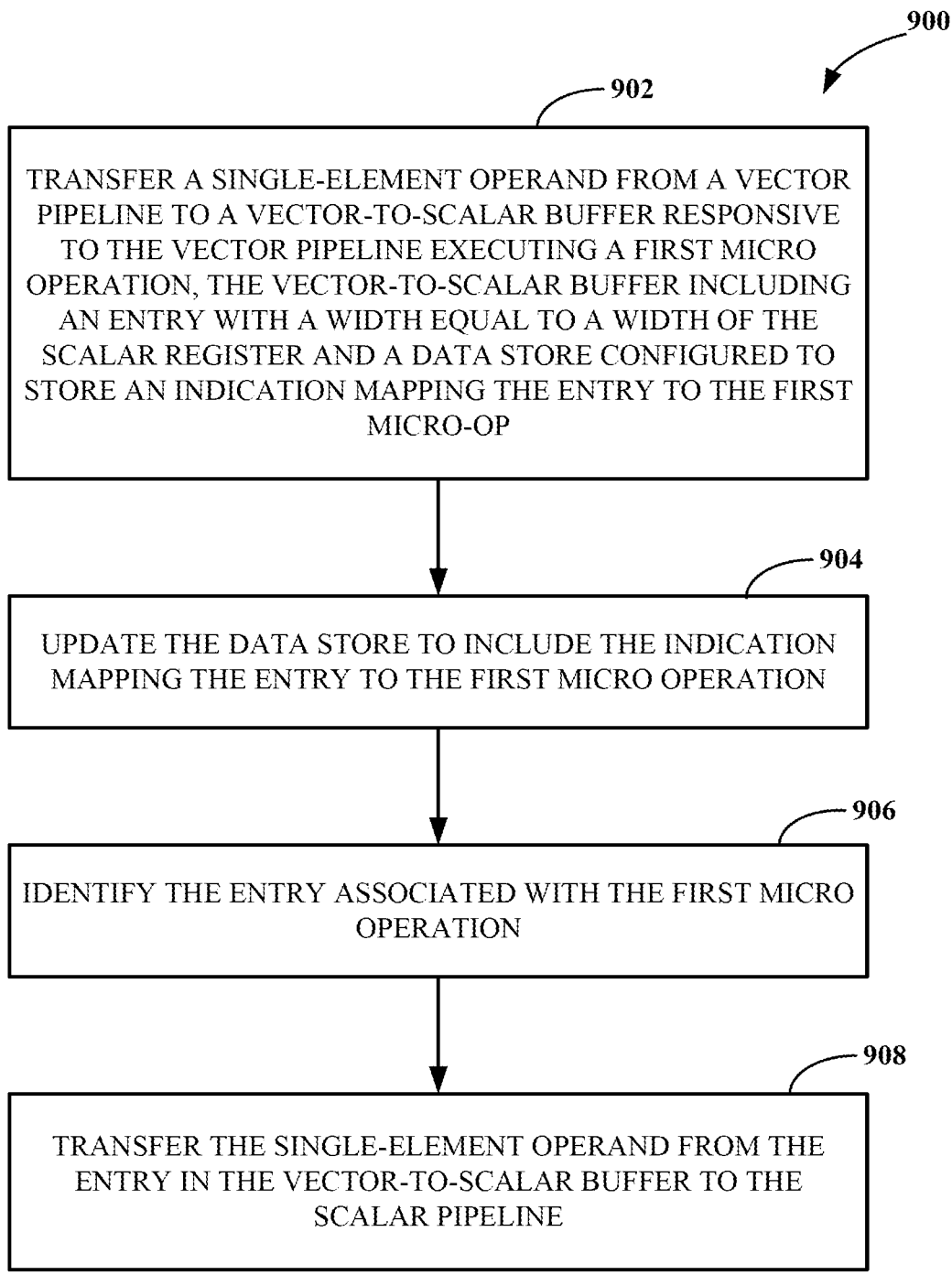
FIG. 9 is a flow chart of an example of a technique for transferring an operand from a vector pipeline to a scalar pipeline.

FIG. 9 is a flowchart of an example of a technique 900 for transferring operands from a vector pipeline to a scalar pipeline in a processor core. The technique 900 can be executed using an integrated circuit, such as the integrated circuit 500 of FIG. 5, having a processing core with a scalar pipeline and a vector pipeline, such as the pipelines shown in FIG. 3A, FIG. 3B, and FIG. 4. The technique 900 can be performed, for example, by executing a vector computer-executable instruction in a processing core. The steps, or operations, of the technique 900 or another technique, method, process, or algorithm described in connection with the implementations disclosed herein can be implemented directly in hardware, firmware, software executed by hardware, circuitry, a software simulation, or a combination thereof.

The technique 900 includes transferring 902 an operand from a vector pipeline to a vector-to-scalar buffer responsive to the vector pipeline executing a first micro-op, wherein the vector-to-scalar buffer includes an entry having a width equal to a width of a scalar register of the scalar pipeline and a data store configured to store an indication mapping the entry to the first micro-op; updating 904 the data store to include the indication mapping the entry to the first micro-op; identifying 906, by the scalar pipeline in response to execution of a second micro-op and in dependence on the indication mapping the entry to the first micro-op, the entry storing the operand; and transferring 908 the operand from the entry in the vector-to-scalar buffer to the scalar pipeline responsive to the scalar pipeline executing the second micro-op. In some implementations, the technique 900 may be implemented using the integrated circuit 500 of FIG. 5.

Transferring 902 an operand from the vector pipeline to the vector-to-scalar buffer may be performed by reading a register identified in the first micro-op to load the operand and saving the operand to the vector-to-scalar buffer at a location specified by a pointer associated with the vector-to-scalar buffer and the first micro-op. For example, referring to the processor pipeline 300 of FIG. 3A, the front end stage 306 can fetch a vector operation, the decode stage 308 can crack the vector operation into a first micro-op for the vector stage and a second micro-op for the scalar stage. The front end stage can then increment a pointer for the vector-to-scalar buffer 324 at the rename stage 310 to allocate an entry associated with the first micro-op and the second micro-op in the vector-to-scalar buffer 324. A read register stage in the vector execution unit 318 can read a register location identified by the first micro-op to load the operand. An execute stage of the vector execution unit 318 can execute the first micro-op to store the operand at an entry in the vector-to-scalar buffer 324 identified by the pointer for the first micro-op set in the rename stage 310.

In some implementations, the entry for the vector-to-scalar buffer 324 may be allocated at a stage other than the rename stage 310. For example, the entry in the vector-to-scalar buffer 324 may be allocated when the first micro-op is ready to issue, such as at an issue stage in the vector execution unit 318.

Updating 904 the data store to include the indication mapping the entry to the first micro-op may be performed by tagging the entry with an identifier identifying the first micro-op that transferred the operand to the vector-to-scalar buffer. For example, the data store may store the identifier associated with the first micro-op and a reference to the location of the entry associated with the first micro-op. Referring to FIG. 3A, the vector execution unit 318 may write an identifier of the micro-op to the data store along with the location of the entry where the operand was transferred to. Because the first micro-op and the second micro-op both originate from the same instruction, they may share a common identifier.

Identifying 906 the entry storing the operand may be performed by accessing the data store and parsing the identifiers associated with the micro-ops that previously stored operands in the scalar-to-vector buffer. The second micro-op may include the same identifier as the first micro-op since they were both generated as part of the same vector instruction. When an identifier matching the identifier of the second micro-op is found, the related location of the entry in the vector-to-scalar buffer 324 can be determined from the mapping information. Referring to FIG. 3A, the vector execution unit 318 may execute the second micro-op in an execute stage of the vector execution unit 318 and in response, access the data store of the vector-to-scalar buffer 324 to determine the entry storing the operand.

Transferring 908 the operand from the entry in the vector-to-scalar buffer to the scalar pipeline can be performed by accessing the entry identified in the mapping information and saving the operand in the scalar pipeline. For example, referring to FIG. 3A, the scalar integer execution unit 312 can execute the second micro-op in an execute stage of the scalar integer execution unit and retrieve the operand from the entry identified in the data store. The second micro-op can then cause the scalar integer execution unit 312 to write the operand to a scalar register in a write back stage.

Figure 10:
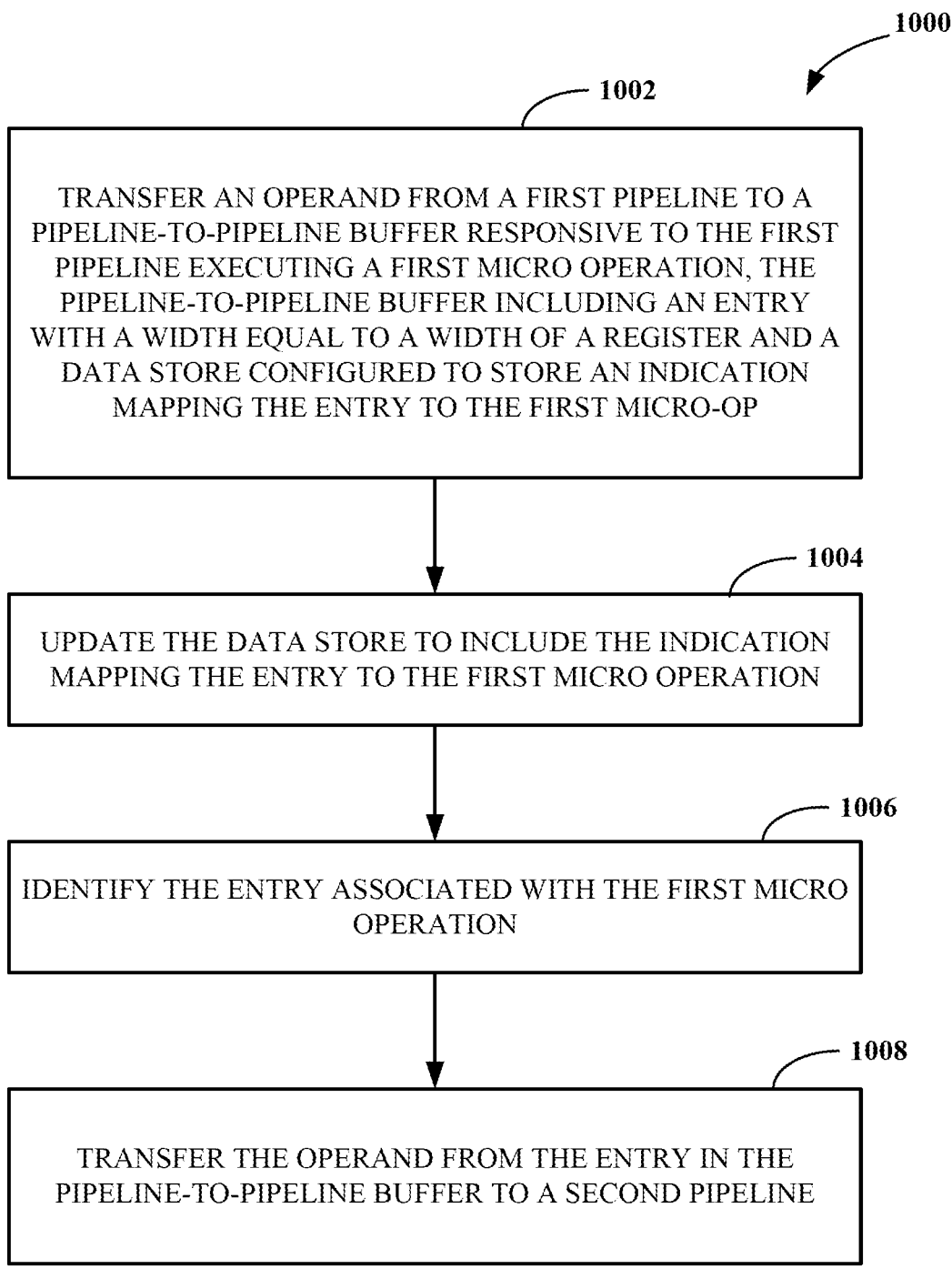
FIG. 10 is a flow chart of an example of a technique for transferring an operand from a first pipeline to a second pipeline.

The techniques described in relation to FIG. 6-9 can be generalized to transferring operands between different pipelines in a processor core. FIG. 10 is a flowchart of an example of a technique 1000 for transferring operands from a first pipeline to a second pipeline in a processor core. The technique 1000 can be executed using an integrated circuit, such as the integrated circuit 500 of FIG. 5, having a processing core with a first pipeline and a second pipeline, such as the pipelines shown in FIG. 3A, FIG. 3B, and FIG. 4. The technique 1000 can be performed, for example, by executing a computer-executable instruction that requires an operand to be transferred between processor pipelines.

The technique 1000 includes transferring 1002 an operand from a first pipeline to a transfer buffer responsive to the first pipeline executing a first micro-op, wherein the transfer buffer includes an entry having a width equal to a width of a register of the first pipeline and a data store configured to store an indication mapping the entry to the first micro-op; updating 1004 the data store to include the indication mapping the entry to the first micro-op; identifying 1006, by the second pipeline in response to execution of a second micro-op and in dependence on the indication mapping the entry to the first micro-op, the entry storing the operand; and transferring 1008 the operand from the entry in the transfer buffer to the second pipeline responsive to the second pipeline executing the second micro-op. In some implementations, the technique 1000 may be implemented using the integrated circuit 500 of FIG. 5.

Transferring 1002 an operand from the first pipeline to the transfer buffer may be performed by reading a register identified in the first micro-op to load the operand and saving the operand to the transfer buffer at a location specified by a pointer associated with the transfer buffer. For example, a fetch stage of a processor pipeline can fetch a first operation. A decode stage can crack the first operation into a first micro-op for the first pipeline and a second micro-op for the second pipeline. A rename stage can then increment a pointer for the transfer buffer to allocate an entry in the transfer buffer. A read register stage can read a register location associated with the first micro-op to load the operand and an execute stage can execute the first micro-op to store the operand at the entry in the transfer buffer identified by the pointer set in the rename stage.

Updating 1004 the data store to include the indication mapping the entry to the first micro-op may be performed by tagging the entry with an identifier identifying the first micro-op. For example, the data store may store the identifier with a reference to the location of the entry the operand was stored in. The first pipeline may write an identifier associated with the first micro-op to the data store along with the location of the entry where the operand was transferred to. Because the first micro-op and the second micro-op both originate from the same instruction, they may share a common identifier.

Identifying 1006 the entry storing the operand may be performed by accessing the data store and parsing identifiers associated with micro-ops that previously stored operands in the transfer buffer. The second micro-op can include the same identifier as the first micro-op since they were both generated as part of the same instruction. When an identifier matching the identifier of the second micro-op is found, the related location of the entry in the transfer buffer can be determined from the mapping information. The second pipeline may execute the second micro-op in an execute stage of the second pipeline and in response, access the data store of the transfer buffer to determine the entry storing the operand.

Transferring 1008 the operand from the entry in the transfer buffer to the second pipeline can be performed by accessing the entry identified in the mapping information and saving the operand in the second pipeline. For example, the second pipeline can execute the second micro-op in an execute stage of the second pipeline and retrieve the operand from the entry associated with the second micro-op as stored in the data store. The second micro-op can then cause the second pipeline to write the operand to a second register in a write back stage.

Figure 11:
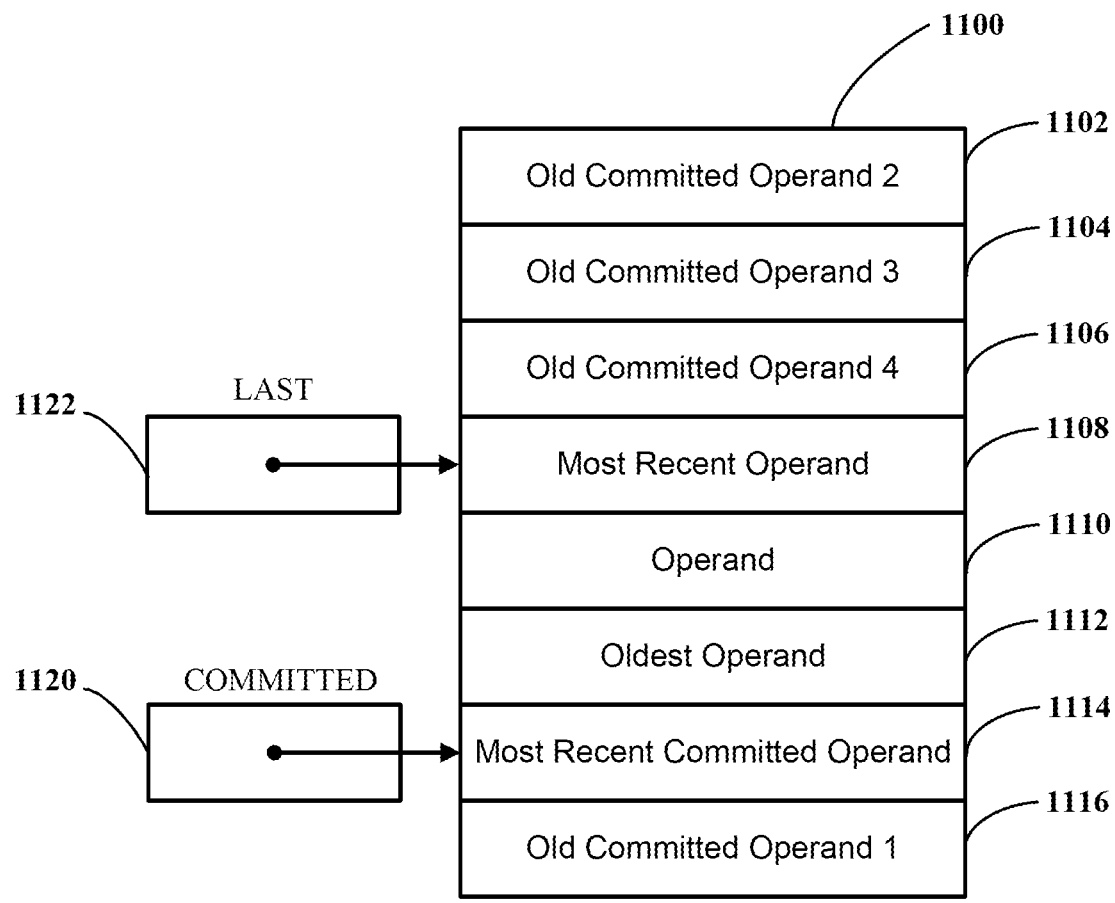
FIG. 11 is an example of a reorder buffer for tracking entries in a transfer buffer.

FIG. 11 is a block diagram of an example of a transfer buffer 1100, such as a scalar-to-vector buffer or a vector-to-scalar buffer, and pointers for tracking available entries for storing operands being transferred between pipelines. The example of FIG. 11 includes eight entries 1102-1116 for storing operands, but different implementations may have more or less entries. Each entry has a width equal to a width of a register at a pipeline data is being transferred to or from.

A "committed" pointer 1120 identifies the entry having the most recently committed operand and a "last" pointer 1122 identifying the entry having the most recently loaded operand. The pointers 1120, 1122 may be stored separately from the transfer buffer 1100 and refer to the entries 1102-1116.

When an instruction requiring an operand to be transferred from a first pipeline to a second pipeline is received, the "last" pointer 1122 is incremented and the value of the "last" pointer 1122 is used by the micro-ops associated with the instruction to write operands into and read operands from the transfer buffer 1100. For example, in response to receiving an instruction requiring an operand to be read from the transfer buffer, the "last" pointer would be incremented to point to entry 1106. The micro-ops would then write and read the entry 1106 when transferring operands as described previously. The value of the "last" pointer may be stored at a data store associated with the transfer buffer and a reference to the identity of the instruction to retrieve the location of the entry 1106 at a later time.

Each entry in a ROB associated with an operation may include an identification of the number of active instructions that need an entry in the transfer buffer. When a ROB entry is retired, the committed point is incremented by the number identified in the ROB. For example, if the micro-op associated with entry 1110 were committed and the number of active instructions requiring an entry in the transfer buffer were two, the committed pointer would increment two entries to point to entry 1110. If there were an exception or if the pipeline needed to be flushed, the "last" pointer is decremented by the number identified in the ROB. For example, if instead of the micro-op associated with entry 1110 is flushed instead of committed, the "last" pointer would be moved downward two entries and point to entry 1112.

The transfer buffer operates in a circular fashion and "rolls over" when the top or the bottom of the transfer buffer is reached. For example, if the "last" pointer 1122 were pointing to entry 1102 and a new instruction required an entry in the transfer buffer, the "last" pointer 1122 would increment one entry, rolling over to entry 1116 and entry 1116 would be allocated for the operation. Similarly, if the "committed" pointer 1120 were pointing to entry 1102 and the entry were committed, the "committed" pointer 1120 would increment one and point to entry 1116.

In a first aspect, the subject matter described in this specification can be embodied in integrated circuit for executing instructions that includes a scalar pipeline including a scalar register configured to store a single element operand; a vector pipeline including a vector register configured to store a multiple-element operand; a scalar-to-vector buffer configured to store a single element operand being transferred from the scalar pipeline to the vector pipeline, wherein the scalar-to-vector buffer includes an entry having a width equal to a width of the scalar register and a data store configured to store an indication mapping the entry to an instruction; scalar-to-buffer execution circuitry configured to, responsive to the instruction, transfer an operand from the scalar pipeline to the entry in the scalar-to-vector buffer and update the data store to map the entry to the instruction; and buffer-to-vector execution circuitry configured to, responsive to the instruction, identify the entry as storing the operand based on the indication in the data store and transfer the operand from the entry in the scalar-to-vector buffer to the vector pipeline.

In the first aspect, the buffer-to-scalar execution circuitry of the integrated circuit may be configured to transfer the operand from the entry to the vector register. In the first aspect, the scalar-to-buffer execution circuitry of the integrated circuit may be configured to transfer the operand from the scalar register to the entry in the scalar-to-vector buffer. In the first aspect, the instruction may be cracked into multiple micro-ops including a first micro-op that flows to the scalar pipeline and causes the scalar execution circuitry to transfer the operand from the scalar pipeline to the entry in the scalar-to-vector buffer and update the data store to map the entry to the instruction and a second micro-op that flows to the vector pipeline and causes the vector execution circuitry to identify the entry as storing the operand based on the indication in the data store and transfer the operand from the entry in the scalar-to-vector buffer to the vector pipeline. In the first aspect, the data store of the scalar-to-vector buffer may include a tag for the entry and the indication is an instruction identifier associated with the instruction. In the first aspect, the instruction identifier may be a reorder buffer identifier of the instruction that is assigned to the instruction by a reorder buffer shared by the scalar pipeline and the vector pipeline. In the first aspect, the transfer of the operand from the scalar register to the entry in the scalar-to-vector buffer is asynchronous with the transfer of the operand from the entry in the scalar-to-vector buffer to the vector pipeline. In the first aspect, the scalar-to-vector buffer includes multiple entries for storing operands being transferred between the scalar pipeline and the vector pipeline. In the first aspect the scalar pipeline, the vector pipeline, and the scalar-to-vector buffer may be components of a single processor core.

In a second aspect, the subject matter described in this specification can be embodied in integrated circuit for executing instructions that includes a scalar pipeline including a scalar register configured to store a single element operand; a vector pipeline including a vector register configured to store a multiple-element operand; a vector-to-scalar buffer configured to store a single element operand being transferred from the vector pipeline to the scalar pipeline, wherein the vector-to-scalar buffer includes an entry with a width equal to a width of the scalar register and a data store configured to store an indication mapping the entry to an instruction; vector-to-buffer execution circuitry configured to, responsive to the instruction, transfer an operand from the vector pipeline to the entry in the vector-to-scalar buffer and update the data store to map the entry to the single element operand; and buffer-to-scalar execution circuitry configured to, responsive to the instruction, identify the entry as storing the operand based on the indication in the data store and transfer from the entry in the vector-to-scalar buffer to the scalar pipeline.

In the second aspect, the instruction may be cracked into multiple micro-ops including a first micro-op that flows to the vector pipeline and causes the vector-to-scalar execution circuitry to transfer the operand from the vector pipeline to the entry in the vector-to-scalar buffer and update the data store to map the entry to the instruction and a second micro-op that flows to the scalar pipeline and causes the scalar execution circuitry to identify the entry as storing the operand based on the indication in the data store and transfer the operand from the entry in the vector-to-scalar buffer to the scalar pipeline. In the second aspect, the data store of the vector-to-scalar buffer includes a tag for the entry and the indication is an instruction identifier associated with the instruction. In the second aspect, the instruction identifier may be a reorder buffer identifier of the instruction that is assigned to the instruction by a reorder buffer shared by the scalar pipeline and the vector pipeline. In the second aspect, the transfer of the operand from the vector pipeline to the entry in the vector-to-scalar buffer may be asynchronous with the transfer of the operand from the entry in the vector-to-scalar buffer to the scalar pipeline. In the second aspect, the scalar-to-vector buffer may include multiple entries for storing operands being transferred between the scalar pipeline and the vector pipeline. In the second aspect, the scalar pipeline, the vector pipeline, and the scalar-to-vector buffer may be components of a single processor core.

In a third aspect, the subject matter described in this specification can be embodied in techniques for transferring an operand from a scalar pipeline to a vector pipeline in a processor core. The techniques may include transferring the operand from a scalar pipeline to a scalar-to-vector buffer responsive to the scalar pipeline executing a first micro-op, wherein the scalar-to-vector buffer includes an entry having a width equal to a width of a scalar register of the scalar pipeline and a data store configured to store an indication mapping the entry to the first micro-op; updating the data store to include the indication mapping the entry to the first micro-op; identifying, by the vector pipeline in response to execution of a second micro-op and in dependence on the indication mapping the entry to the first micro-op, the entry storing the operand; and transferring the operand from the entry in the scalar-to-vector buffer to the vector pipeline responsive to the vector pipeline executing the second micro-op.

In the third aspect, the methods may include updating a pointer referencing the entry in the scalar-to-vector buffer in response to the first micro-op being committed. In the third aspect, the methods may include cracking an instruction into multiple micro-ops including the first micro-op that flows to the scalar pipeline and the second micro-op that flows to the vector pipeline. In the third aspect, the methods may include holding the operand in the scalar-to-vector buffer for a number of clock cycles greater than a length of the scalar pipeline. In the third aspect, the methods may include updating a pointer to allocate the entry in the scalar-to-vector buffer.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. An integrated circuit comprising:
    a scalar pipeline including a scalar register configured to store a single element operand;
    a vector pipeline including a vector register configured to store a multiple-element operand;
    a scalar-to-vector buffer configured to store a single element operand being transferred from the scalar pipeline to the vector pipeline, wherein the scalar-to-vector buffer includes an entry having a width equal to a width of the scalar register and a data store configured to store an indication mapping the entry to an instruction;
    scalar-to-buffer execution circuitry configured to, responsive to the instruction, transfer an operand from the scalar pipeline to the entry in the scalar-to-vector buffer and update the data store to map the entry to the instruction; and
    buffer-to-vector execution circuitry configured to, responsive to the instruction, identify the entry as storing the operand based on the indication in the data store and transfer the operand from the entry in the scalar-to-vector buffer to the vector pipeline.

2. The integrated circuit of claim 1 wherein the buffer-to-vector execution circuitry is configured to transfer the operand from the entry to the vector register.

3. The integrated circuit of claim 1 wherein the scalar-to-buffer execution circuitry is configured to transfer the operand from the scalar register to the entry in the scalar-to-vector buffer.

4. The integrated circuit of claim 1 wherein the instruction is cracked into multiple micro-ops including a first micro-op that flows to the scalar pipeline and causes the scalar execution circuitry to transfer the operand from the scalar pipeline to the entry in the scalar-to-vector buffer and update the data store to map the entry to the instruction and a second micro-op that flows to the vector pipeline and causes the vector execution circuitry to identify the entry as storing the operand based on the indication in the data store and transfer the operand from the entry in the scalar-to-vector buffer to the vector pipeline.

5. The integrated circuit of claim 1 wherein the data store of the scalar-to-vector buffer includes a tag for the entry and the indication is an instruction identifier associated with the instruction.

6. The integrated circuit of claim 5 wherein the instruction identifier is a reorder buffer identifier of the instruction that is assigned to the instruction by a reorder buffer shared by the scalar pipeline and the vector pipeline.

7. The integrated circuit of claim 1 wherein the transfer of the operand from the scalar register to the entry in the scalar-to-vector buffer is asynchronous with the transfer of the operand from the entry in the scalar-to-vector buffer to the vector pipeline.

8. The integrated circuit of claim 1 wherein the scalar-to-vector buffer includes multiple entries for storing operands being transferred between the scalar pipeline and the vector pipeline.

9. The integrated circuit of claim 1 wherein the scalar pipeline, the vector pipeline, and the scalar-to-vector buffer are components of a single processor core.

10. An integrated circuit comprising:
    a scalar pipeline including a scalar register configured to store a single element operand;
    a vector pipeline including a vector register configured to store a multiple-element operand;
    a vector-to-scalar buffer configured to store a single element operand being transferred from the vector pipeline to the scalar pipeline, wherein the vector-to-scalar buffer includes an entry with a width equal to a width of the scalar register and a data store configured to store an indication mapping the entry to an instruction;
    vector-to-buffer execution circuitry configured to, responsive to the instruction, transfer an operand from the vector pipeline to the entry in the vector-to-scalar buffer and update the data store to map the entry to the single element operand; and
    buffer-to-scalar execution circuitry configured to, responsive to the instruction, identify the entry as storing the operand based on the indication in the data store and transfer from the entry in the vector-to-scalar buffer to the scalar pipeline.

11. The integrated circuit of claim 10 wherein the instruction is cracked into multiple micro-ops including a first micro-op that flows to the vector pipeline and causes the vector-to-buffer execution circuitry to transfer the operand from the vector pipeline to the entry in the vector-to-scalar buffer and update the data store to map the entry to the instruction and a second micro-op that flows to the scalar pipeline and causes the scalar execution circuitry to identify the entry as storing the operand based on the indication in the data store and transfer the operand from the entry in the vector-to-scalar buffer to the scalar pipeline.

12. The integrated circuit of claim 10 wherein the data store of the vector-to-scalar buffer includes a tag for the entry and the indication is an instruction identifier associated with the instruction.

13. The integrated circuit of claim 12 wherein the instruction identifier is a reorder buffer identifier of the instruction that is assigned to the instruction by a reorder buffer shared by the scalar pipeline and the vector pipeline.

14. The integrated circuit of claim 10 wherein the transfer of the operand from the vector pipeline to the entry in the vector-to-scalar buffer is asynchronous with the transfer of the operand from the entry in the vector-to-scalar buffer to the scalar pipeline.

15. The integrated circuit of claim 10 wherein the scalar pipeline, the vector pipeline, and the vector-to-scalar buffer are components of a single processor core.

16. A method for transferring an operand from a scalar pipeline to a vector pipeline in a processor core, the method comprising:
   transferring the operand from a scalar pipeline to a scalar-to-vector buffer responsive to the scalar pipeline executing a first micro-op, wherein the scalar-to-vector buffer includes an entry having a width equal to a width of a scalar register of the scalar pipeline and a data store configured to store an indication mapping the entry to the first micro-op;
   updating the data store to include the indication mapping the entry to the first micro-op;
   identifying, by the vector pipeline in response to execution of a second micro-op and in dependence on the indication mapping the entry to the first micro-op, the entry storing the operand; and
   transferring the operand from the entry in the scalar-to-vector buffer to the vector pipeline responsive to the vector pipeline executing the second micro-op.

17. The method of claim 16, further comprising updating a pointer referencing the entry in the scalar-to-vector buffer in response to the first micro-op being committed.

18. The method of claim 16, further comprising cracking an instruction into multiple micro-ops including the first micro-op that flows to the scalar pipeline and the second micro-op that flows to the vector pipeline.

19. The method of claim 16, further comprising holding the operand in the scalar-to-vector buffer for a number of clock cycles greater than a length of the scalar pipeline.

20. The method of claim 16, further comprising updating a pointer to allocate the entry in the scalar-to-vector buffer.

* * * * *